United States Patent
Lee et al.

(10) Patent No.: US 7,610,438 B2
(45) Date of Patent: Oct. 27, 2009

(54) FLASH-MEMORY CARD FOR CACHING A HARD DISK DRIVE WITH DATA-AREA TOGGLING OF POINTERS STORED IN A RAM LOOKUP TABLE

(75) Inventors: Charles C. Lee, Cupertino, CA (US); I-Kang Yu, Palo Alto, CA (US); Edward W. Lee, Mountain View, CA (US); Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 479 days.

(21) Appl. No.: 11/623,860

(22) Filed: Jan. 17, 2007

(65) Prior Publication Data

US 2007/0118688 A1 May 24, 2007

Related U.S. Application Data

(63) Continuation-in-part of application No. 09/478,720, filed on Jan. 6, 2000, now Pat. No. 7,257,714, and a continuation-in-part of application No. 10/956,826, filed on Oct. 1, 2004, now Pat. No. 7,299,316, which is a continuation-in-part of application No. 10/789,333, filed on Feb. 26, 2004, now Pat. No. 7,318,117.

(51) Int. Cl.
*G06F 12/06* (2006.01)
(52) U.S. Cl. ...................... 711/103; 711/113
(58) Field of Classification Search .................. None
See application file for complete search history.

(56) References Cited

U.S. PATENT DOCUMENTS

| | | | |
|---|---|---|---|
| 4,908,793 A | 3/1990 | Yamagata et al. | |
| 4,949,240 A | 8/1990 | Iijima | |
| 5,341,339 A | 8/1994 | Wells | |
| 5,568,439 A | 10/1996 | Harari | |
| 5,819,307 A | 10/1998 | Iwamoto et al. | |
| 6,000,006 A | 12/1999 | Bruce et al. | |
| 6,914,846 B2 | 7/2005 | Harari et al. | |
| 2002/0041517 A1 | 4/2002 | Kim et al. | |
| 2002/0141244 A1 | 10/2002 | Bruce et al. | |
| 2004/0088481 A1* | 5/2004 | Garney | 711/113 |
| 2005/0138296 A1* | 6/2005 | Coulson et al. | 711/141 |
| 2005/0144396 A1* | 6/2005 | Eschmann et al. | 711/143 |
| 2006/0069852 A1 | 3/2006 | Aasheim et al. | |

* cited by examiner

*Primary Examiner*—Tuan V Thai
*Assistant Examiner*—Ngoc V Dinh
(74) *Attorney, Agent, or Firm*—Stuart T. Auvinen; gPatent LLC

(57) ABSTRACT

A flash-memory cache card caches data that a host writes to a hard disk drive. A flash-memory array has physical blocks of flash memory arranged into first and second data areas having M blocks each, and a wear-leveling-counter pool. An incoming logical sector address (LSA) from a host is mapped to one of M entries in a RAM lookup table using a hash of modulo M. The RAM entry stores a mapping to a physical block in a foreground area that is either the first or the second data area. Pages in the physical block are read for a matching LSA that indicates a cache hit. Full pages are written back to the hard disk and erased in the background while the other data area becomes the foreground area. A new physical block with a low wear-level count is selected from blocks in the new foreground area.

21 Claims, 20 Drawing Sheets

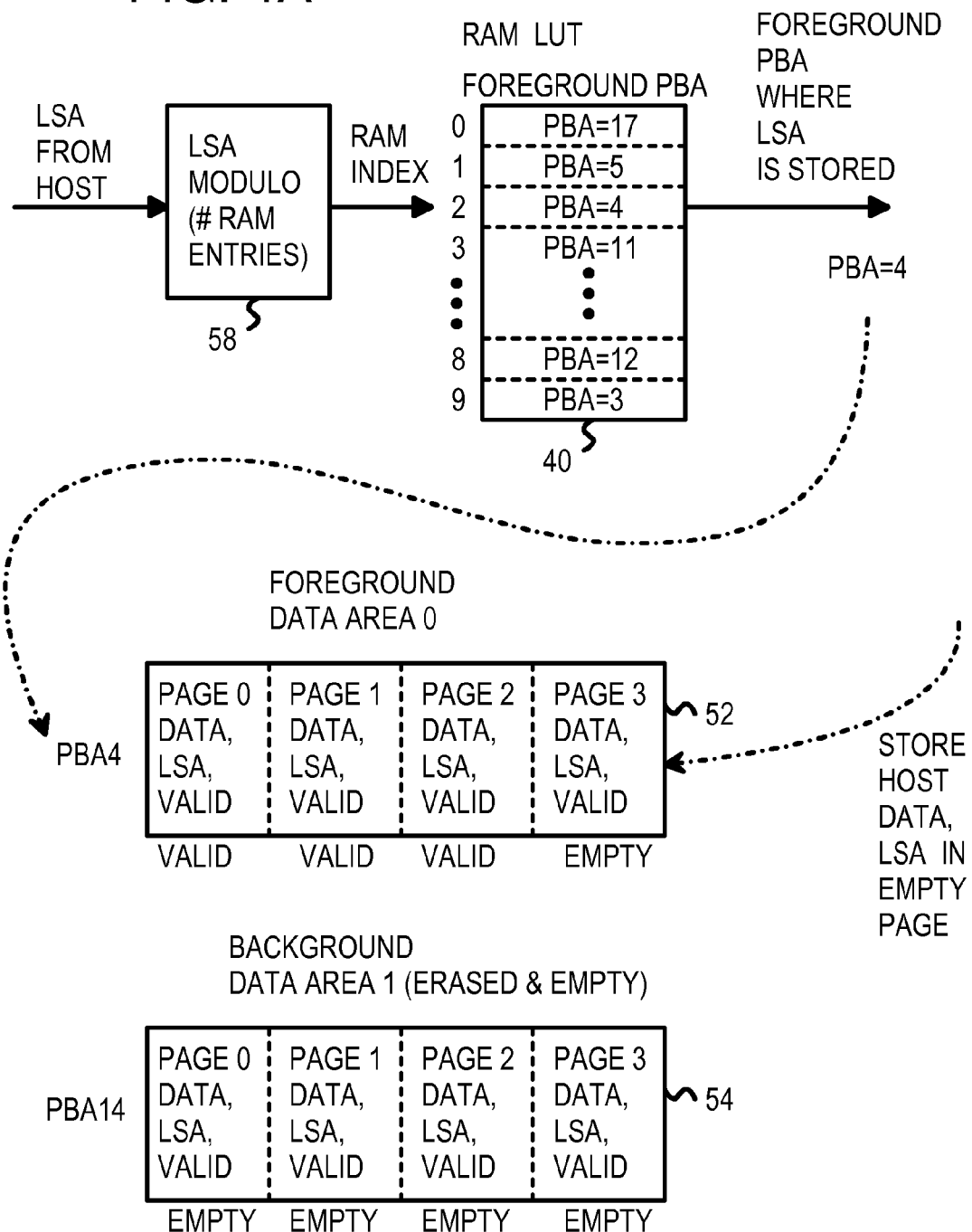

FIG. 9A

WL CNTR POOL 56

WL COUNTERS

PBA21 (CURRENT):

| | WLC PBA0 | WLC PBA1 | WLC PBA2 | WLC PBA3 | ... | WLC PBA19 | WLC PBA20 | WLC PBA21 | ... | WLC PBA127 | BLK ID | HISTORY CNTR |
|---|---|---|---|---|---|---|---|---|---|---|---|---|
| PAGE0 | 1 | 1 | 1 | 1 | | 1'S | 1'S | 1'S | | 1'S | 9999 | 11111110 |
| PAGE1 | 1 | 1 | 2 | 1 | | 1'S | 1'S | 1'S | | 1'S | 9999 | 11111100 |
| PAGE2 | 1 | 1 | 3 | 1 | | 1'S | 1'S | 1'S | | 1'S | 9999 | 11111000 |
| PAGE3 | 1 | 1 | 1 | 2 | | 1'S | 1'S | 1'S | | 1'S | 9999 | 11110000 |

PBA2 ERASED 3 TIMES
PBA3 ERASED 2 TIMES

PBA22 (EMPTY):

| | | | | | | | | | | | | |
|---|---|---|---|---|---|---|---|---|---|---|---|---|
| PAGE0 | 1'S | 1'S | 1'S | 1'S | | 1'S | 1'S | 1'S | | 1'S | FFFF | 1'S |
| PAGE1 | 1'S | 1'S | 1'S | 1'S | | 1'S | 1'S | 1'S | | 1'S | FFFF | 1'S |
| PAGE2 | 1'S | 1'S | 1'S | 1'S | | 1'S | 1'S | 1'S | | 1'S | FFFF | 1'S |
| PAGE3 | 1'S | 1'S | 1'S | 1'S | | 1'S | 1'S | 1'S | | 1'S | FFFF | 1'S |

PBA23 (EMPTY):

| | | | | | | | | | | | | |
|---|---|---|---|---|---|---|---|---|---|---|---|---|
| PAGE0 | 1'S | 1'S | 1'S | 1'S | | 1'S | 1'S | 1'S | | 1'S | FFFF | 1'S |
| PAGE1 | 1'S | 1'S | 1'S | 1'S | | 1'S | 1'S | 1'S | | 1'S | FFFF | 1'S |
| PAGE2 | 1'S | 1'S | 1'S | 1'S | | 1'S | 1'S | 1'S | | 1'S | FFFF | 1'S |
| PAGE3 | 1'S | 1'S | 1'S | 1'S | | 1'S | 1'S | 1'S | | 1'S | FFFF | 1'S |

FLASH-MEMORY CARD FOR CACHING A HARD DISK DRIVE WITH DATA-AREA TOGGLING OF POINTERS STORED IN A RAM LOOKUP TABLE

RELATED APPLICATION

This application is a continuation-in-part (CIP) of the application for "Electronic Data Storage Medium with Fingerprint Verification Capability", U.S. Ser. No. 09/478,720 (now U.S. Pat. No. 7,257,714), filed Jan. 6, 2000. This application is also a CIP of "USB Card Reader", U.S. Ser. No. 10/956,826 (now U.S. Pat. No. 7,299,826), filed Oct. 1, 2004, which is a CIP of "System and Method for Controlling Flash Memory", U.S. Ser. No. 10/789,333 (now U.S. Pat. No. 7,318,117), filed Feb. 26, 2004.

FIELD OF THE INVENTION

This invention relates to non-volatile caches of hard disks, and more particularly to a flash-memory cache controller using foreground and background areas of flash memory.

BACKGROUND OF THE INVENTION

Hard disk drives are commonly used in personal computers, servers, video recorders, and many other kind of electronic devices for mass storage. Mass storage is used to store large amounts of data that is typically copied to a faster random-access memory such as a dynamic-random-access memory (DRAM) for use by a processor. While the processor's DRAM is randomly accessible, mass storage is block-accessible. An entire block of data must be read or written from the mass storage device. A RAM may allow reading and writing of individual bytes or words of 4 or 8 bytes, while a mass storage device requires that a sector or 512 bytes or more be read or written together.

While mass storage devices are useful, they are much slower than the processor's main DRAM memory. Seek times to locate a sector to access may depend on the physical rotation of a disk platter, rather than just the movement of electrons. The large amount of data in a sector also increases delays to access data.

A mass storage device such as a hard disk may employ a cache to improve performance. A DRAM or SRAM cache can store data to be written to the hard disk at a later time. Recently-accessed data can be stored in the RAM cache, allowing reads to be supplied from the RAM cache rather than from the slower hard disk.

Flash memory may also be used as a mass storage device in lieu of a hard disk. Flash-memory arrays are also block-accessible, but have a much faster access time than rotating media such as a hard disk. However, since flash memory chips are block-addressable rather than randomly-accessible, flash is not as easy to use for a cache as DRAM or SRAM.

Since power can fail before the data from the cache is copied onto the hard disk, cached data can be lost or corrupted if the cache is volatile. DRAM or SRAM may use a battery backup that provides enough energy to finish writing back data when the power fails. Alternatively, flash or other non-volatile memory may be used for the cache.

What is desired is a cache for a hard disk or other rotational mass storage device that uses flash memory for cache storage. A flash-memory cache controller that caches data for a rotational mass-storage device is desirable. A caching technique that arranges flash-memory blocks into foreground and background areas is desirable.

BRIEF DESCRIPTION OF THE DRAWINGS

FIGS. 4A-C highlight looking up an incoming LSA in the RAM lookup table to find the physical block address (PBA), and toggling data areas when all pages in the PBA are full.

FIGS. 9A-D highlight wear-leveling counters being updating and migrated among pages and pre-erased blocks in the wear-leveling-counter pool.

DETAILED DESCRIPTION

The present invention relates to an improvement in flash-memory-based caches. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
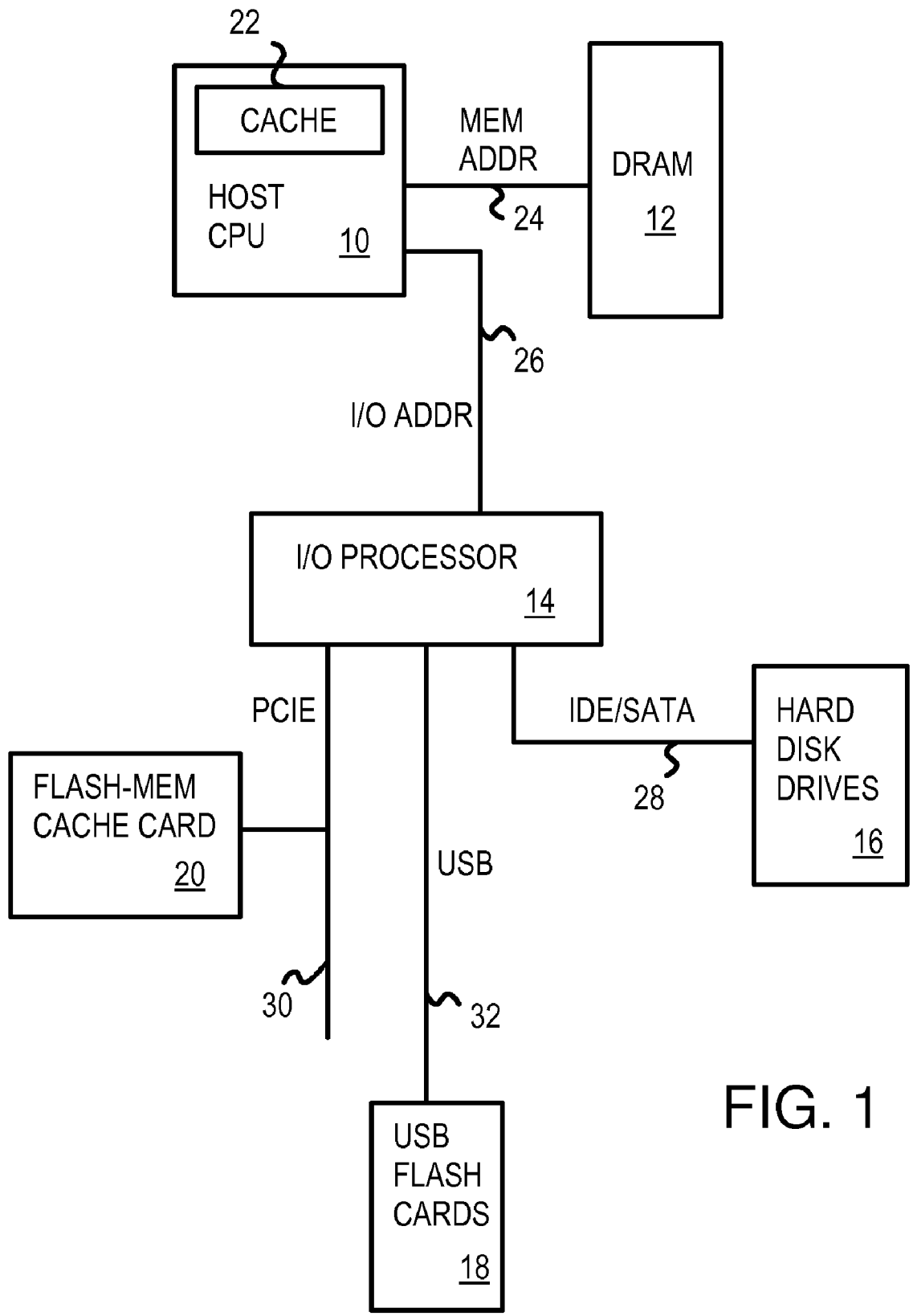
FIG. 1 is a block diagram of a computer system using a flash-memory to cache a hard disk.

FIG. 1 is a block diagram of a computer system using a flash-memory to cache a hard disk. Host CPU 10 executes instructions from DRAM 12 and read and writes data from DRAM 12, perhaps caching instructions or data from DRAM 12 in processor cache 22, which is often a SRAM cache.

While memory addresses from host CPU 10 are sent over memory bus 24 to DRAM 12, input-output (I/O) addresses are sent from host CPU 10 over I/O bus 26 to I/O processor 14, which may be part of a peripheral-bus chip set. I/O processor 14 may have controllers and interfaces for several I/O buses, including integrated device electronics (IDE) or Serial AT-Attachment (SATA) interfaces to hard-disk drives 16 over IDE/SATA bus 28. Blocks or sectors of data are read and written from mass storage devices on IDE/SATA bus 28 and are usually transferred to and from DRAM 12, either directly by direct-memory access (DMA), or indirectly by instructions executed by host CPU 10.

I/O processor 14 may also have a Universal-Serial-Bus (USB) interface to USB bus 32, which can connect to a variety of plug-in or fixed USB devices, such as USB flash cards 18. I/O processor 14 also has a Peripheral Component Interconnect Express (PCIE) interface to PCIE bus 30. Flash-memory cache card 20 is installed on PCIE bus 30 in this embodiment, but could be on USB bus 32, IDE/SATA bus 28, or another bus.

I/O addresses from I/O processor 14 are examined by flash-memory cache card 20 to determine when the addresses are for hard-disk drives 16. Data to and from hard-disk drives 16 is intercepted by flash-memory cache card 20 and may be stored in a flash-memory cache controlled by flash-memory cache card 20, either in flash-memory chips on flash-memory cache card 20, or external flash memory such as in USB flash cards 18.

Figure 2:
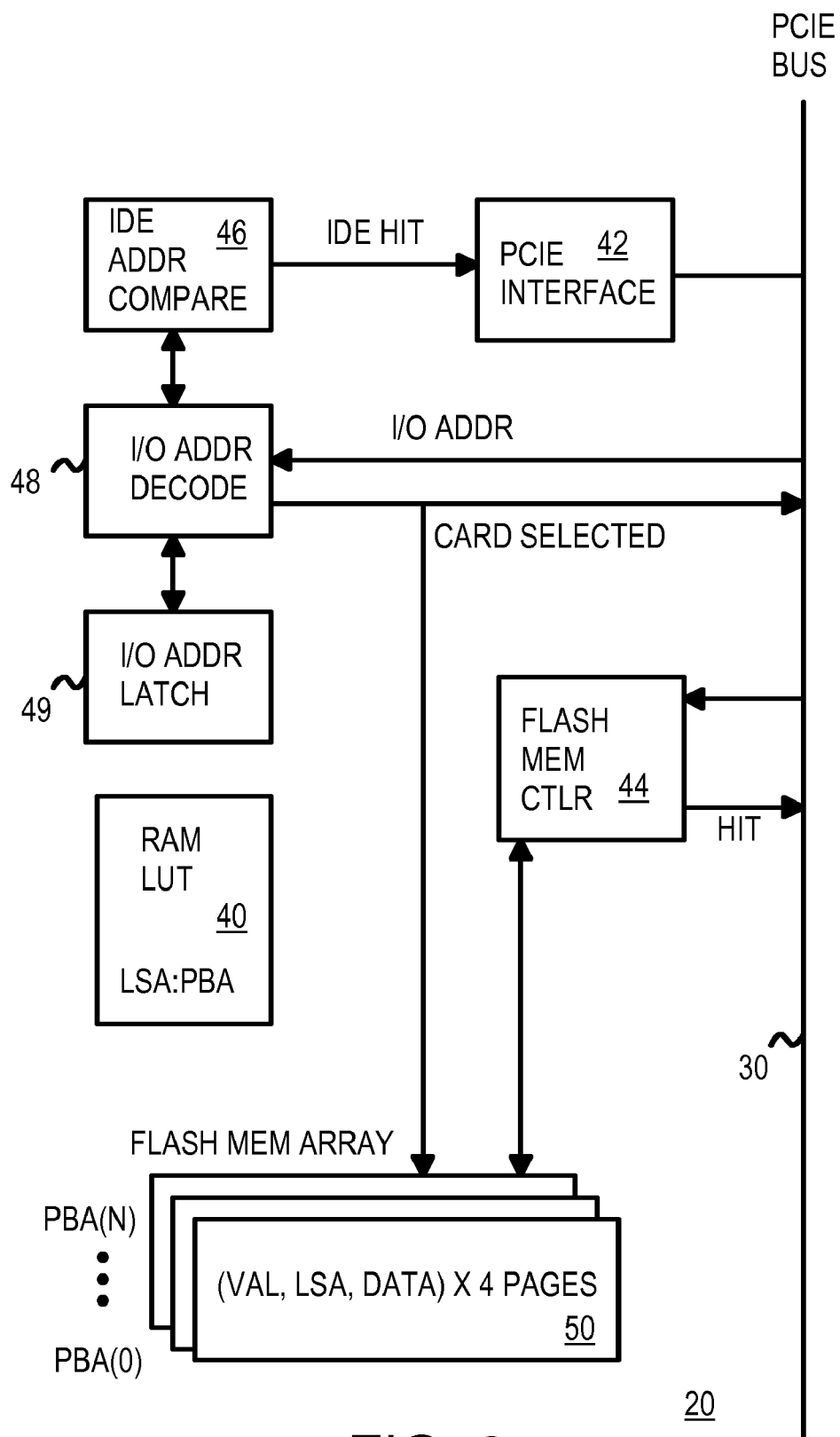
FIG. 2 is a block diagram of a flash-memory cache card.

FIG. 2 is a block diagram of a flash-memory cache card. Flash-memory cache card 20 connects to a host through an external I/O processor over PCIE bus 30. PCIE interface 42 generates packets and performs handshaking in response to commands received over PCIE bus 30. An I/O address received over PCIE bus 30 is decoded by I/O address decoder 48, which activates a card-select signal when the I/O address falls within the I/O range of flash-memory cache card 20 that is stored or programmed into I/O address latch 49.

IDE address comparator 46 compares the I/O address from PCIE bus 30 to the range of I/O addresses used by hard-disk drives 16 (FIG. 1). When the I/O address falls within the range for hard-disk drives 16, IDE address comparator 46 activates an IDE hit signal, causing PCIE interface 42 to intercept the command. This prevents hard-disk drives 16 from responding to the command.

The sector address can be extracted from the command sent over PCIE bus 30. The sector address is known as the logical sector address (LSA) and is a logical address from host CPU 10, rather than a physical address within a hard-disk or other mass-storage device. The LSA sector address can be looked up in RAM lookup table 40 to find the physical block address (PBA). The PBA is a physical address of a block of flash memory in flash-memory array 50. This PBA is a cache of data stored in a sector on hard-disk drives 16, which uses its own hard-disk mapping of the LSA to locate the physical sector on hard-disk drives 16.

RAM lookup table 40 stores LSA to PBA mappings for sectors that are cached in flash-memory array 50. RAM lookup table 40 provides a fast way to determine which PBA in flash-memory array 50 to read to determine if the data is cached. Each PBA is divided into several pages, such as 4, 8, 64, or some other number. Each page holds one sector of data, and also stores the LSA for the data, and valid bits. Flash memory controller 44 can look up the LSA in RAM lookup table 40 to find the PBA, then read the physical block for that PBA from flash-memory array 50. The LSA's for each page in that PBA are read and compared to the LSA from the host's request to determine if a match occurred. Flash-memory controller 44 then examines the page's valid bits to validate the match and generates a hit signal to the host. The hit signal can be sent in a command or packet over PCIE bus 30.

Figure 3:
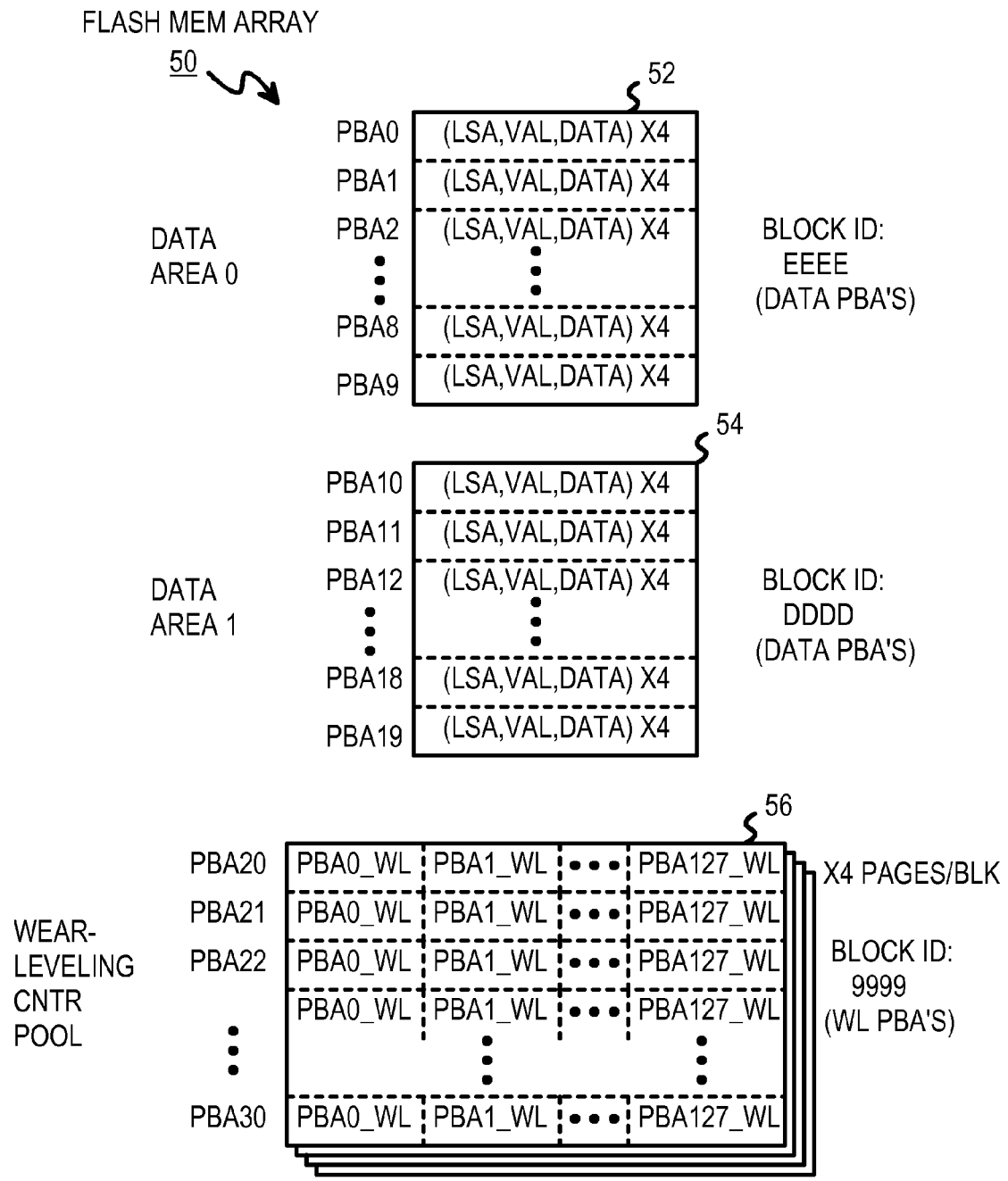
FIG. 3 shows an arrangement of physical blocks in the cache's flash-memory array.

FIG. 3 shows an arrangement of physical blocks in the cache's flash-memory array. Flash-memory array 50 contains one or more flash-memory chips that are block-addressable. The data in a block may be erased to all 1's, and then written with 0's. However, data may not be written from 0 back to 1 without erasing the whole block.

Each block contains 4 pages in this simplified embodiment, although larger numbers of pages such as 64 pages per block are contemplated in more realistic embodiments. Cached data is stored in two data areas: first data area 52 and second data area 54, also called data area 0 and data area 1. Both data areas 52 have the same number of physical blocks, such as 10 in this simplified embodiment, or 32, 64, 256, etc. in larger embodiments. The physical blocks are labeled PBA0, PBA1, PBA2, . . . PBA9 in first area 52, and PBA10, PBA11, PBA12, . . . PBA19 in second area 54. Each physical block has 4 pages, and each page stores a sector of cached data, the LSA logical sector address for that page's data, and valid bits.

Each physical block also stores a block identifier and perhaps other block information. The block ID for each block in first data area 52 is set to EEEE, while all blocks in second data area 54 have block ID's set to DDDD. Thus the block ID indicates which area the physical block belongs to.

A third area of flash-memory array 50 is used to store wear-leveling information. Physical blocks PBA21 to PBA30 are in wear-leveling-counter pool 56. All blocks in wear-leveling-counter pool 56 have their block ID set to 9999 to distinguish them from data blocks in areas 52, 54.

Each physical block in wear-leveling-counter pool 56 contains four pages, and each page contains up to 127 wear-leveling counters. Each physical block in data areas 52, 54, and in wear-leveling-counter pool 56 has a wear-leveling counter. These wear-leveling counters are labeled PBA0_WL, PBA1_WL, PBA2_WL, . . . PBA126_WL, PBA127_WL.

For a page of 512 bytes, each of the 127 counters may be 4 bytes, and able to count to 4 G. A wear-leveling counter is incremented each time a block is erased, so up to 4 G erases per block are supported, which is much larger than 100,000 erase cycles commonly supported.

Each page of each block in wear-leveling-counter pool 56 contains all 127 wear-leveling counters. Only one of the pages in wear-leveling-counter pool 56 contains the most recent and currently-valid wear-leveling counters for the whole cache system. The other pages are redundant, containing stale wear-leveling counters, or blank counters for future use.

As physical blocks are erased and the blocks' wear-leveling counters are incremented, it may be necessary to change a bit in a wear-leveling counter from 0 to 1. This can only happen when the whole block that contains the wear-leveling counter is erased. Since the wear-leveling counters would be destroyed by an erase, all of the wear-leveling counters are copied to a blank block in wear-leveling-counter pool 56 before the old block. Then the values of the wear-leveling counters are not lost, but merely transferred to a new block in wear-leveling-counter pool 56. The old block with the stale wear-leveling counters can then be erased and recycled into wear-leveling-counter pool 56.

Figure 4B:
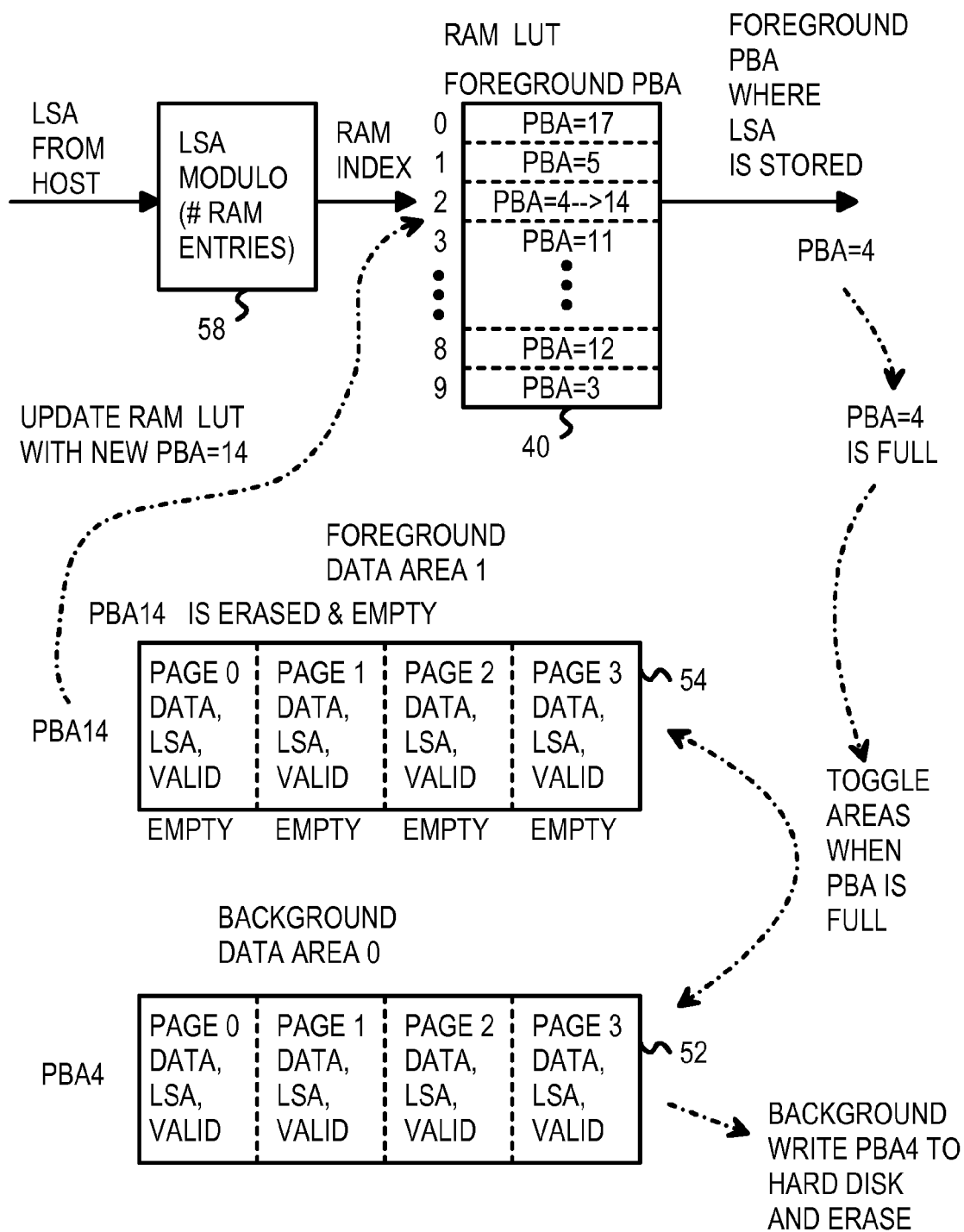
Figure 4C:
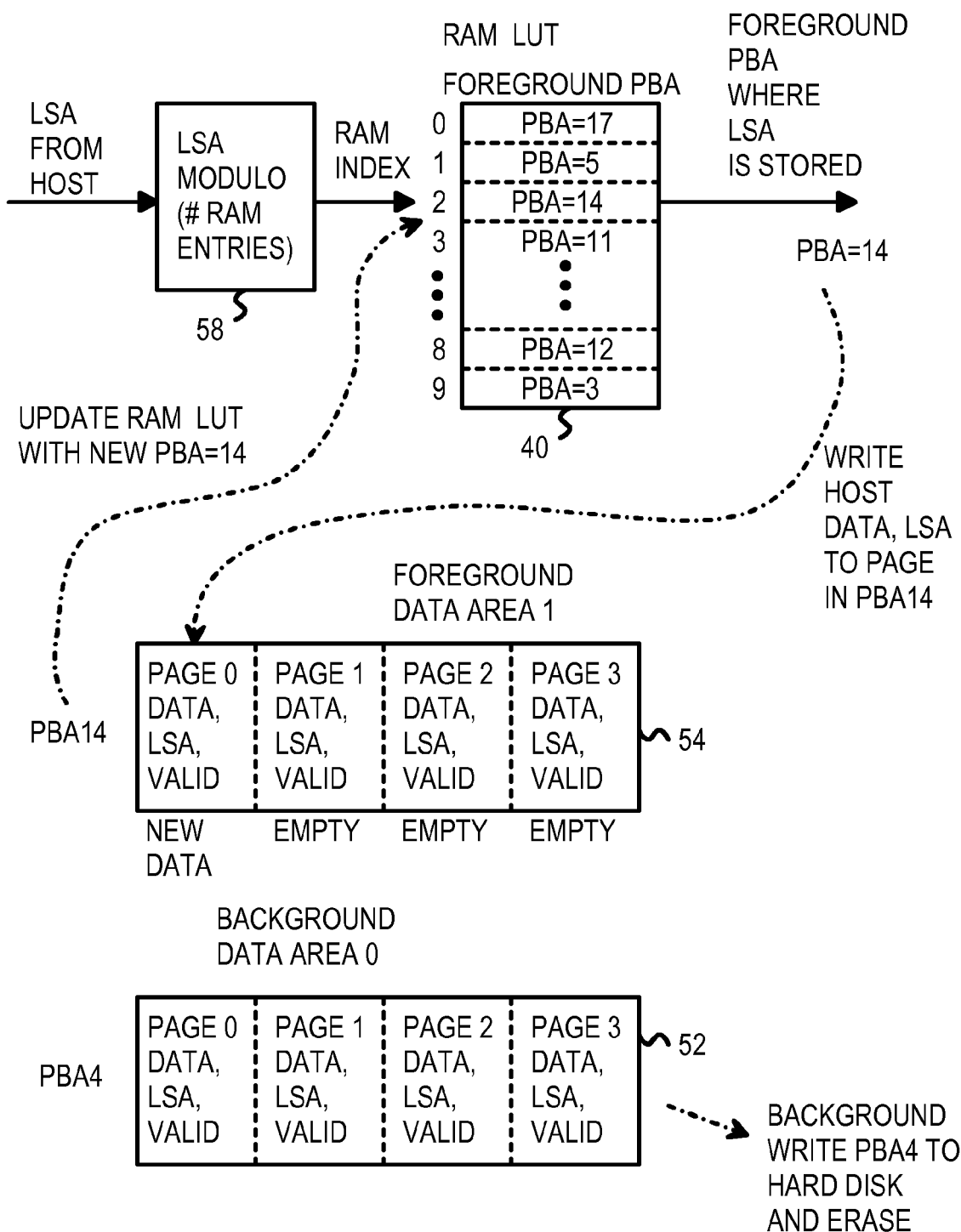

FIGS. 4A-C highlight looking up an incoming LSA in the RAM lookup table to find the physical block address (PBA), and toggling data areas when all pages in the PBA are full. In FIG. 4A, the host sends a write request to the flash-memory cache card (20 of FIG. 1). The request contains a LSA that identifies one of the 512-byte logical sectors on the hard disk. The request is intercepted by the flash-memory cache card and the LSA extracted from the request.

The LSA is hashed using modulo generator 58 to select one of the entries in RAM lookup table 40. The modulo used by modulo generator 58 is one half of the total number of physical blocks of data, which is also equal to the number of physical blocks per data area, either first data area 52 or second data area 54, when the data areas have the same number of physical blocks.

For the simplified example of 20 physical blocks, or 10 physical blocks per data area, the module used by modulo generator 58 is 10. An LSA of 12 maps to entry 2 in RAM lookup table 40, as do LSA's of 22, 32, 2, etc. In this simplified example, the entry # in RAM lookup table 40 is just the last digit of the LSA, when the LSA is expressed in decimal notation and the modulo is 10. More realistic examples may use powers of 2, such as tables and modulus of 8, 16, 32, 64, etc.

The values stored in each entry in RAM lookup table 40 are foreground blocks. Foreground blocks are currently accessible. When a block that is full needs to be written with another page of data, the full block is toggled to the background for write-back to the hard disk and erasing. Another block from the background is selected and toggled to the foreground to receive the new page of data. Background blocks are not accessible, either being copied back to the hard disk, or empty and waiting to be toggled to the foreground.

In the example of FIG. 4A, an LSA from the host of 12 is mapped to entry #2 in RAM lookup table 40 by modulo generator 58. Entry #2 in RAM lookup table 40 indicates PBA 4 is the physical block that is mapped to all LSA's that generate 2 as the remainder from modulo generator 58. LSA=12 can only be stored in foreground block PBA=4.

Since PBA=4 is in first data area 52, PBA=4 is read from first data area 52 of flash-memory array 50 (FIG. 3). Each PBA has four pages, and each page stores 512 bytes of sector data, and the LSA and valid bits for this sector data. LSA's from each of the four pages are read and compared to the incoming LSA from the host. If the page's LSA matches, and the page's valid bits are valid, the data can be returned to the host from that page for a read. The hard disk does not have to be accessed. Reading the sector data from flash-memory array 50 can significantly improve performance since access of the hard disk is slow.

When a read miss occurs, the data can be fetched from the hard disk and returned to the host. When an allocate-on-read-miss policy is implemented, the sector data from the hard disk can be written into an empty page in the PBA pointed to by the entry in RAM lookup table 40, or to a new PBA as described later.

For a write, when a valid match occurs, the old sector data in the matching page is stale and is being replaced with new sector data from the host. The entire sector is over-written with new data since the hard disk is block-accessible rather than randomly-accessible. The matching page in the PBA is invalidated.

Whether the LSA matched or did not match the valid pages in the PBA pointed to by the entry in RAM lookup table 40, the new sector data (either from the host for a write, or from the hard disk for a read miss) can be written to an empty page in the PBA, such as page 3 in the example of FIG. 4A. The incoming LSA is also written to the empty page and the page's valid bits are set.

In FIG. 4B, another write or read miss occurs with another LSA that maps to the same PBA. For example, LSA=22 has the same remainder (2) from modulo generator 58 and also selects entry #2 in RAM lookup table 40, which points to PBA 4. However, since PBA 4 is full and has no empty pages, the new sector data cannot be written to this physical page. Old sector data cannot be over-written without erasing the whole block, since this is a flash memory that does not allow writing bits from 0 to 1.

Old block PBA 4 is toggled from the foreground to the background, and data area 0 that contains PBA 4 is now the background area for the current access. The old sector data in PBA 4 is written to the hard disk. Any pages that have been invalidated are not written to the hard disk since there is another page with more current data. After write-back to the hard disk is complete, the old block is erased and PBA 4 can be recycled and used again. This copy-back and erase can take a significant amount of time, and can be done in the background since a new block replaces the old PBA 4 as the new foreground block.

Since the old block PBA 4 was in first data area 52, second data area 54 is toggled to become the new foreground area. One of the 10 physical blocks in second data area 54 is selected to replace the old block. Wear-leveling counters can be examined for all empty blocks in second data area 54, and the empty block with the lowest wear-leveling count can be selected as the new foreground block. Blocks in second data area 54 that are not empty are not selected. Some of the blocks in second data area 54 may be used as foreground blocks for other entries in RAM lookup table 40, or may be background blocks that have not yet finished erasing, or may be faulty blocks.

For example, blocks 11, 12, and 17 are already being used as foreground blocks, since they appear in RAM lookup table 40 for entries #3, 8, 0, respectively. Blocks 10, 13 may not be erased yet, so only blocks 14, 15, 16, 18, and 19 are available. Examining the wear-level counters for available blocks 14, 15, 16, 18, and 19 shows that block 14 has the lowest wear-leveling count and is thus selected.

The mapping in entry #2 in RAM lookup table 40 is changed from PBA=4 to PBA=14, toggling old full block PBA 4 to the background for write-back and erasure, and toggling empty block PBA 14 to the foreground. All four pages in PBA 14 are erased and ready to receive sector data.

In FIG. 4C, the new mapping in RAM lookup table 40 is used to select PBA 14 for LSA 22 that was not able to find an empty page in old block PBA 4 (FIG. 4B). The first page in PBA 14 is empty, so the new sector data from the host is written to this page. The incoming LSA is also written to this first page, and the page's valid bits are set. PBA 14 can accept 3 more sectors of data in future writes or read misses for incoming LSA's that have a remainder of 2 from modulo generator 58. The writing of the old sector data in PBA 4 may continue for some time as a background process.

Figure 5A:
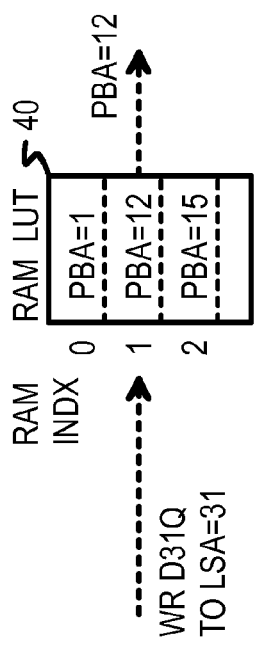
FIG. 5A-E illustrate accessing foreground data areas and toggling areas in more detail.
Figure 5A:
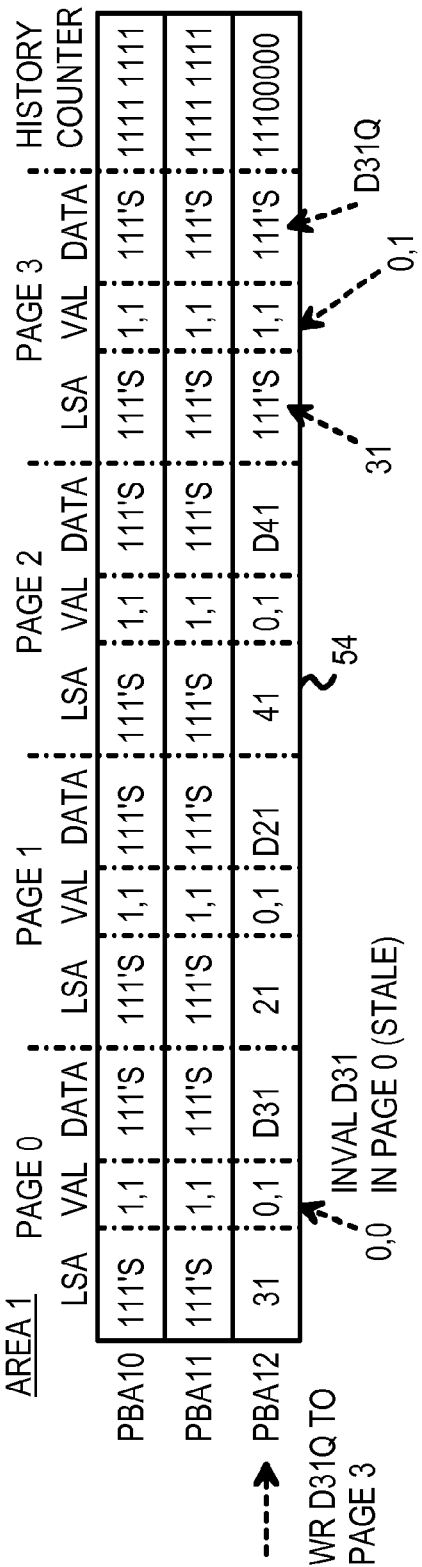

FIG. 5A-E illustrate accessing foreground data areas and toggling areas in more detail. In FIG. 5A, the host requests a write to LSA 31 of sector data having a value of D3Q. LSA 31 modulo 10 has a remainder of 1, and thus selects entry 1 in RAM lookup table 40. This entry maps LSA 31 (and LSA 1, 11, 21, . . . ) to PBA 12.

PBA 12 is in data area 1, second data area 54. For this access, second data area 54 is the foreground area, while first data area 52 is the background area. The foreground and background areas can change for each access. For example, for LSA's than map through entry 0 in RAM lookup table 40 to PBA 1, the foreground area is area 0, while for other LSA's that through entries 1, 2 in RAM lookup table 40 to PBA 12, 15, the foreground area is area 1.

PBA 12 is read from the flash-memory array and each page's stored LSA is compared to the incoming LSA of 31. Page 0 has an LSA of 31 that matches the incoming LSA 12, and the valid bits are set to 0, 1, the valid state. The data in page 0, tkD31, is being replaced by D31Q from the host, so page 0 is invalidated by updating the valid bits to 0,0, the invalid state. If this was a read rather than a write, the data D31 from page 0 would be returned to the host and the valid bits unchanged.

Since bits in flash memory can be written only from 1 to 0, the valid bits are initially erased to 1,1, which is the empty state. When valid data is written into a page, the page's valid bits are "set" to 0,1, which is the valid state. The data is invalidated by writing the valid bits to 0,1, the invalid state. The 1,0 state is not used in this embodiment.

In PBA 12, page 1 is valid, but has an LSA of 21 which does not match. Page 2 is valid and has an LSA of 41, which also mismatches. Page 3 is empty since its valid bits are 1,1. Page 3 has not been written since the last erase, and this has all bits set to 1 in the data and LSA fields. Random data can be written into page 3 just once, since any 0 cannot be over-written back to 1 in flash memory.

The incoming LSA of 31 is written into the LSA field of page 3, while the new sector data of value D31Q is written into the 512-byte data field. The valid bits are set to 0,1 to indicate that the data in page 3 is valid.

Figure 5B:
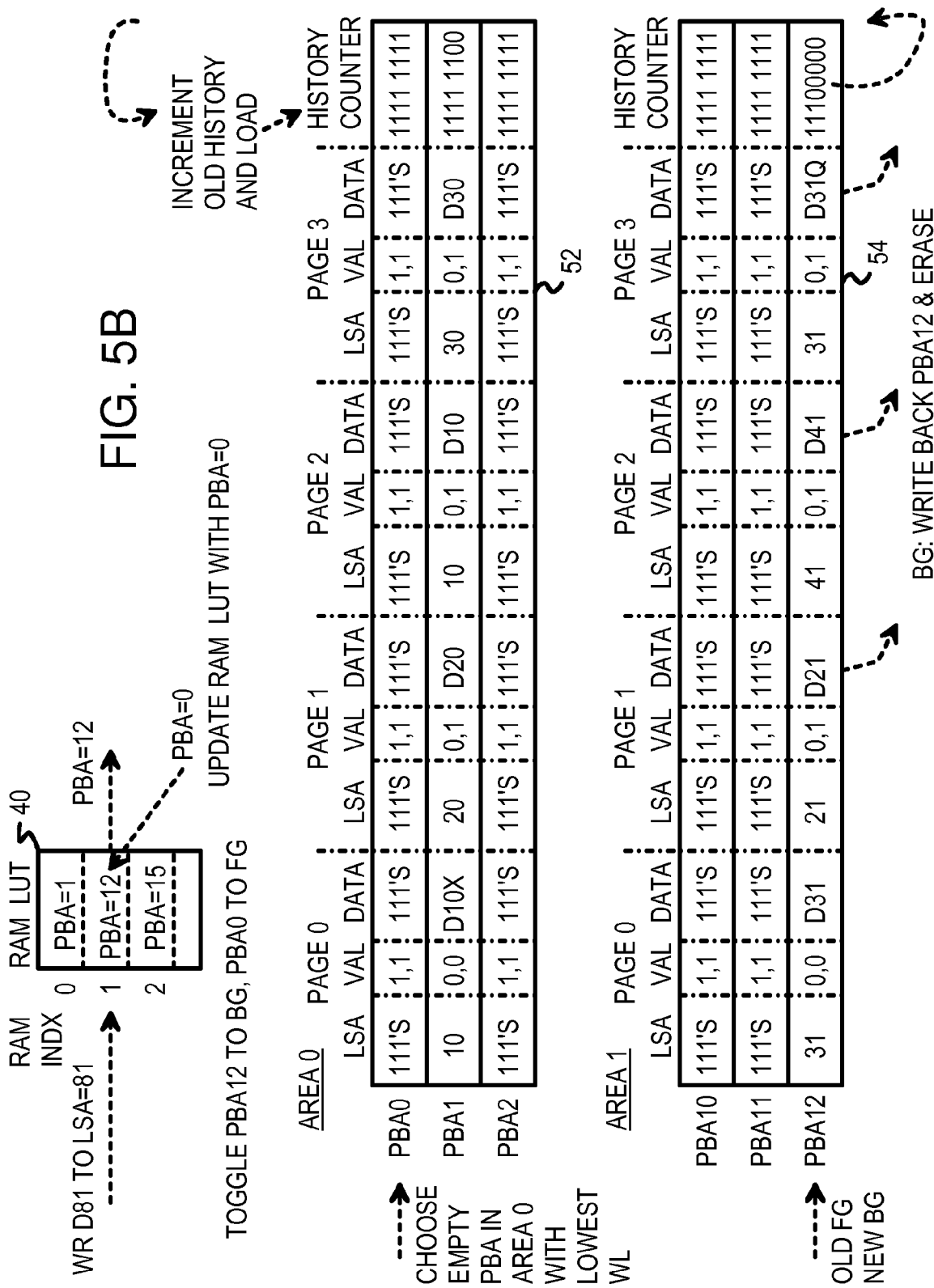
Figure 5C:
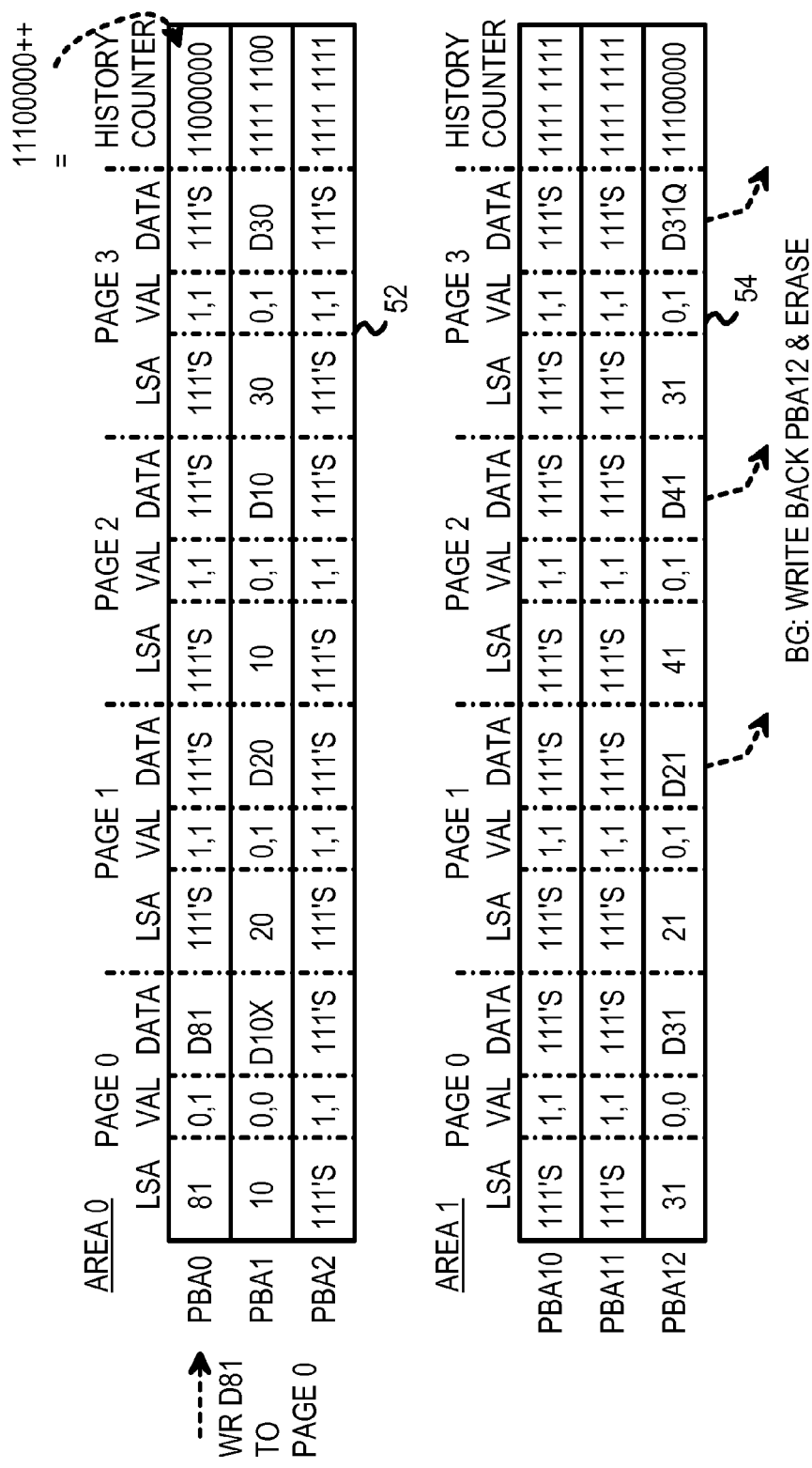
Figure 5D:
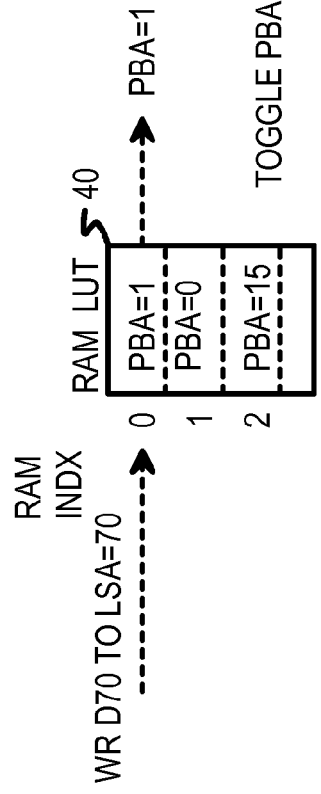

In FIG. 5B, the host writes data D81 to LSA 81. This access again is mapped to PBA 12 by RAM lookup table 40. However, this time the new LSA of 81 does not match any of the stored LSA in the four pages of PBA 12. There is no empty page in PBA 12 to accept the new data. PBA 12 is toggled to the background and the valid sectors of data D21, D41, and D31Q in page 1, 2, 3 are written back to the hard disk. Page 0 is invalid and not written back to disk. Some time later, after write back completes, PBA 12 is erased (FIG. 5D).

If the host request was a read, it would miss and PBA 12 would still be written back to hard disk and another empty block toggled to accept the read data from the hard disk (an allocate on a read miss).

PBA 12 belongs to second data area 54, which becomes the background area. First data area 52 becomes the foreground area. PBA 1 is not empty and cannot be chosen. PBA's 0 and 2 are empty and may be chosen. Other PBA's 3-9 could also be chosen if empty. The wear-leveling counters are consulted, and PBA 0 is found to have the lowest wear-leveling count. PBA 0 is chosen as the least-erased available block, and becomes the new foreground block. PBA=0 is loaded into entry 1 in RAM lookup table 40, replacing the mapping PBA=12 to the old block.

Since power could fail at any time, a history counter is used to keep track of which blocks are foreground and which are background. Recovery software or firmware can read the history counters to determine which block is older and which is newer when two blocks have the same remainder (modulo of the LSA's), and thus map to the same entry in RAM lookup table 40. The newer block with the more recent history count is the foreground block; the older block with the older history count is the background block.

History counters are "incremented" by shifting zeros in from the right. The history counter from the old block PBA 12 (11100000) is read, incremented, and copied to the history counter field of the new block PBA 0, 11000000, as shown in FIG. 5C. Since 11100000 is an older history count than 11000000, PBA 12 is the older block and PBA 0 is the newer block.

In FIG. 5C, the history counter has been copied from old PBA 12 and incremented before storing in new PBA 0. Pages 1, 2, 3 remain empty with all bits 1, but page 0 is written with the host data D81, the incoming LSA 81, and the valid bits are set to 0,1. PBA 0 has 3 empty pages remaining. Old block PBA 12 is still being written back to disk.

In FIG. 5D, a new request from the host is received. This is a write of sector data having a value of D70 to LSA 70. Entry 0 in RAM lookup table 40 is selected by LSA 70 module 10. The mapping in entry 0 is PBA=1. PBA 1 is full, so there is no room for the new sector data D70. No invalidations are needed since none of the four pages have LSA's that match.

PBA 1 is toggled to the background and its sector data written back to hard disk. The other data area, second data area 54, becomes the foreground area. An available empty block in second data area 54 with the lowest wear-leveling count is chosen for the new foreground block.

Old block PBA 12 has now finished being written back to disk and erased and is available, as are PBA's 10, 11 in second data area 54. PBA 10 has the lowest wear-leveling count and is chosen. PBA=10 is loaded into RAM lookup table 40 as the new mapping for entry 0.

Figure 5E:
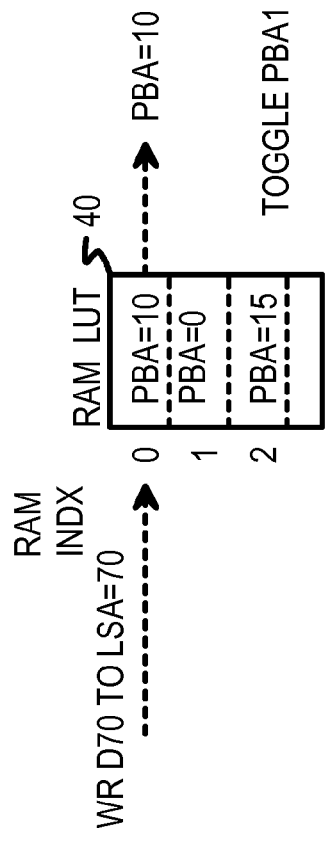
Figure 5E:
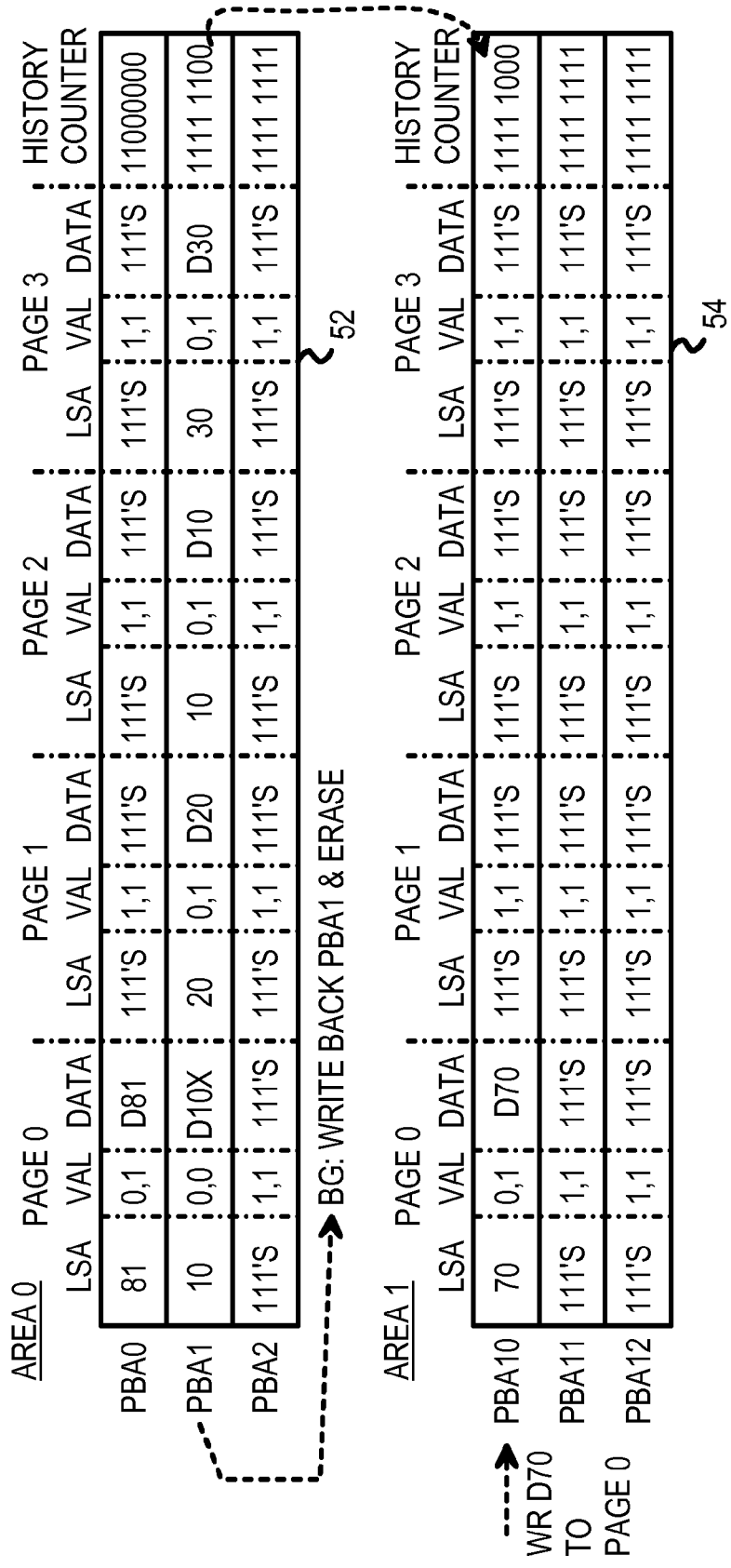

In FIG. 5E, the host data D70 is written into the data sector field of the first page in new block PBA 10. The incoming LSA 70 is written in and the valid bits are set to 0,1. The history counter from the old block for this RAM index, PBA 1, is copied and incremented and written into new block PBA 10. The old history counter value of 11111100 is incremented to 11111000. The old block PBA 1 is still being written back to disk and erased.

Figure 6:
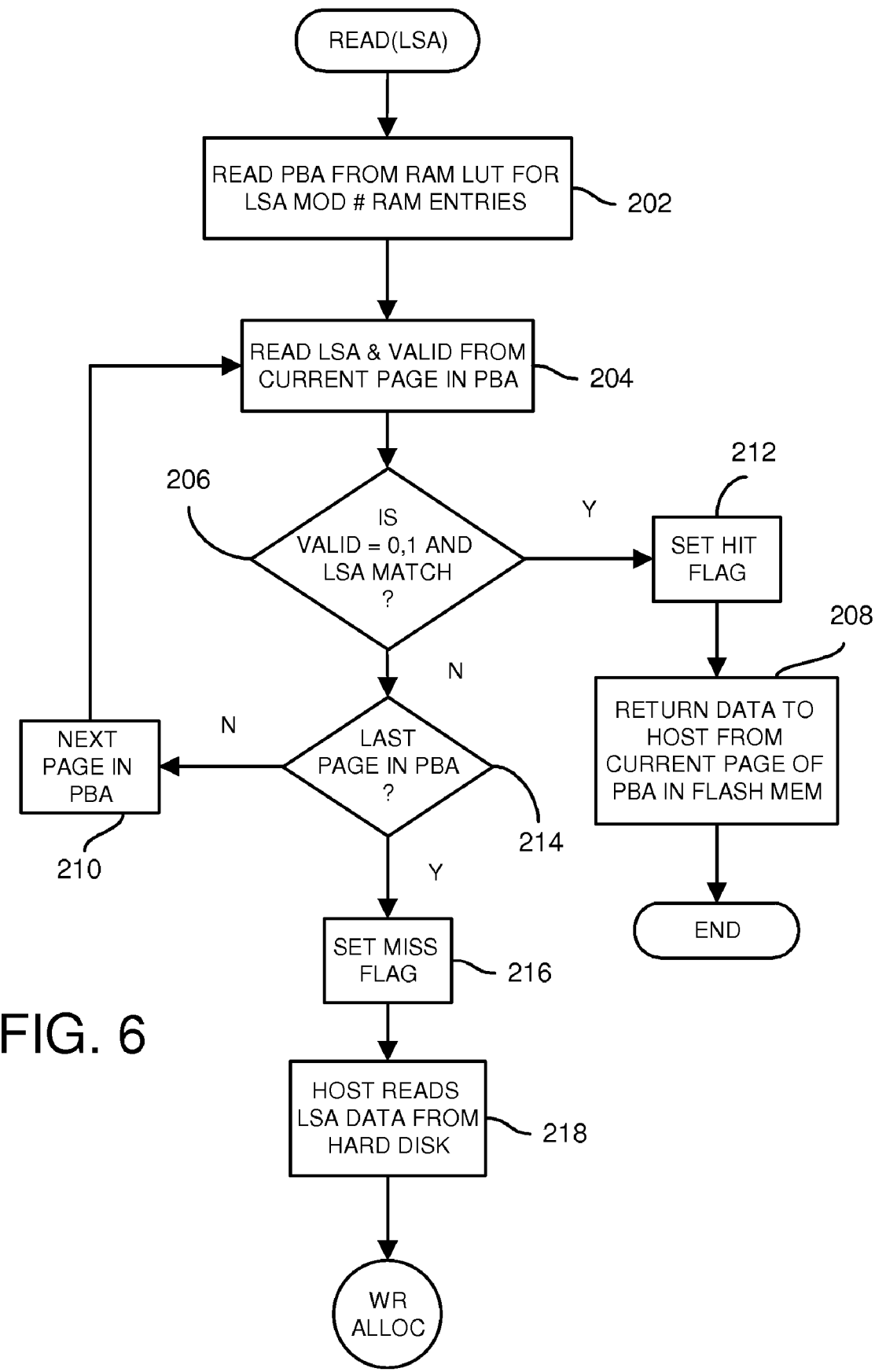
FIG. 6 is a flowchart of a host read operation.
Figure 7A:
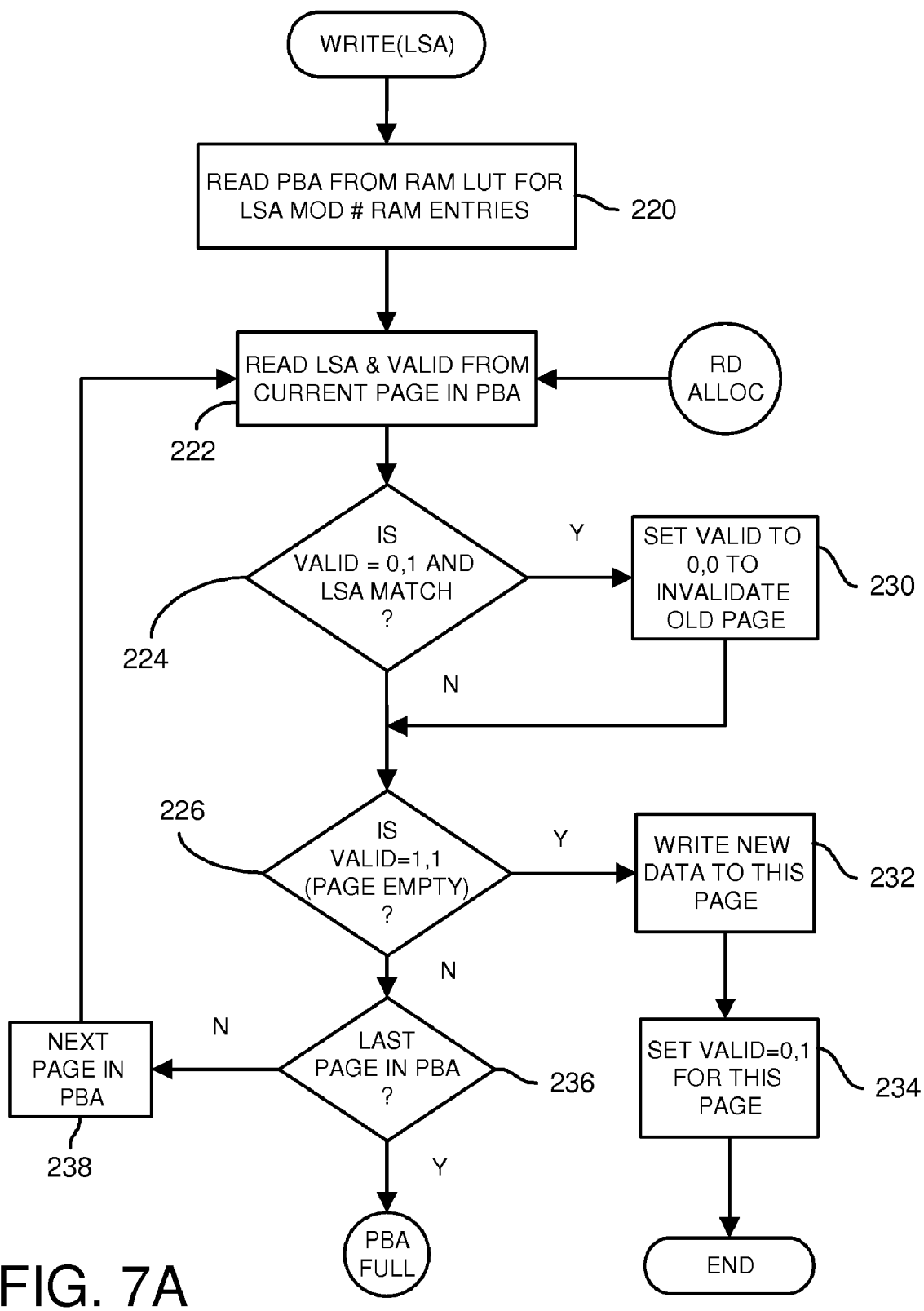
FIGS. 7A-B is a flowchart of a host write or read-allocation for a read miss.
Figure 7B:
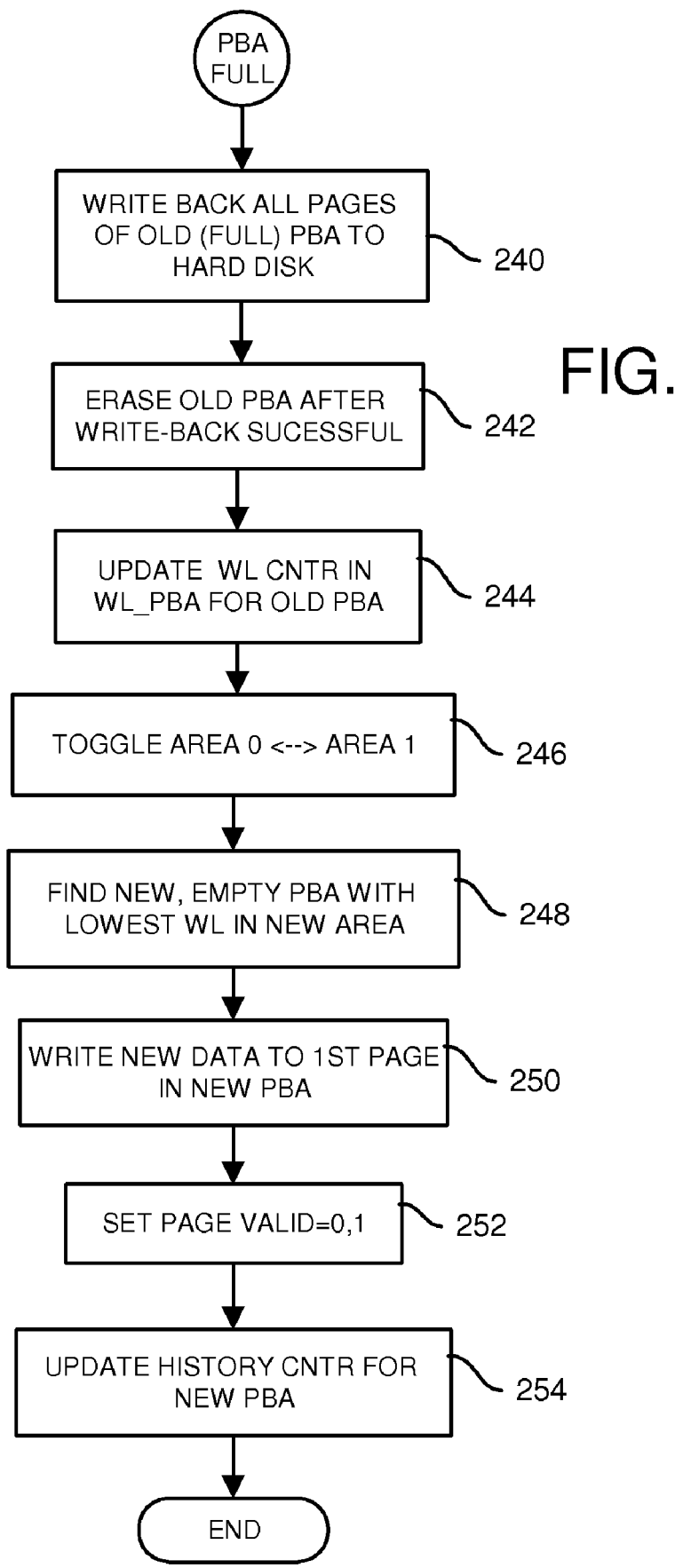
Figure 8:
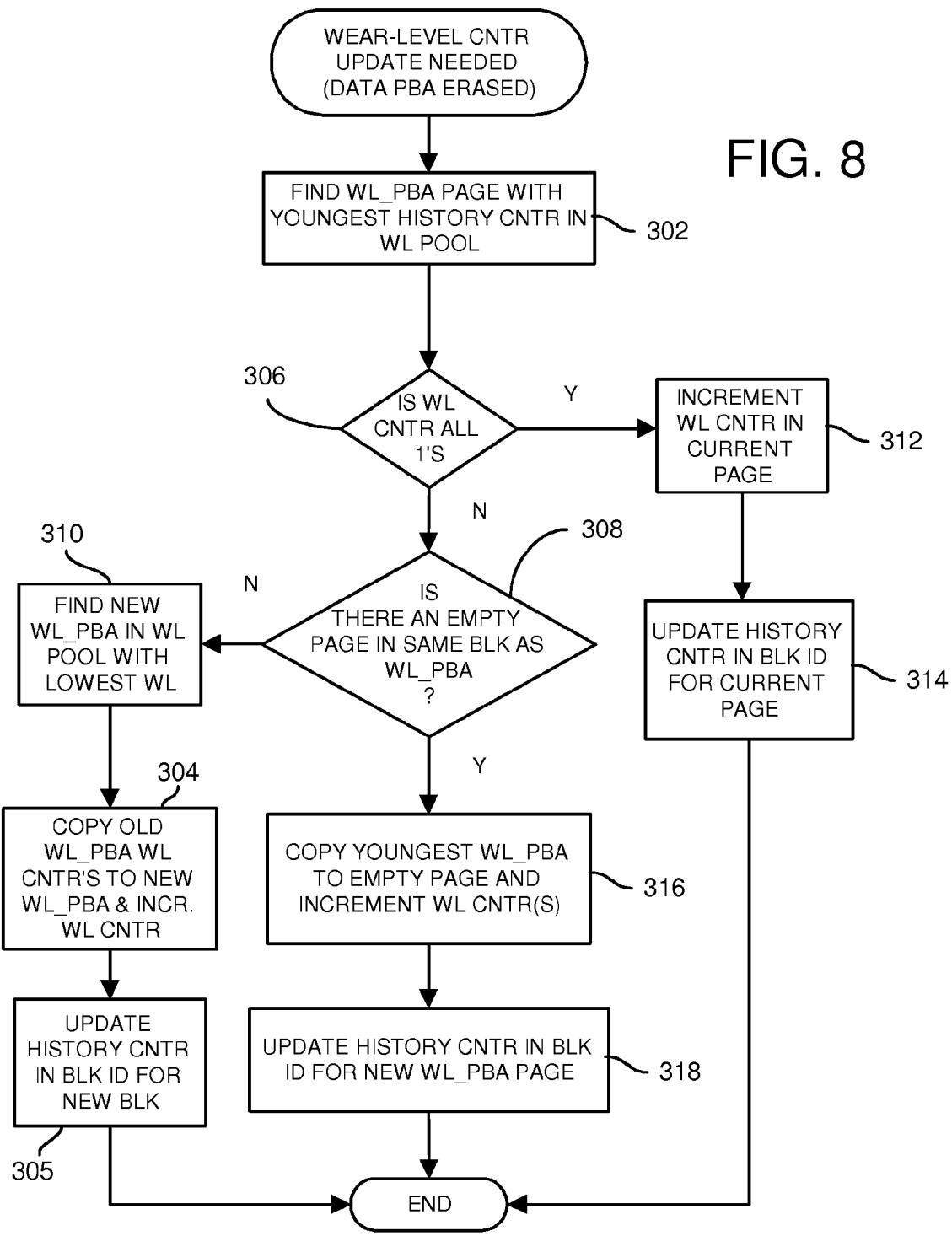
FIG. 8 is a flowchart of wear-leveling management.

Flowcharts—FIGS. 6-8

FIG. 6 is a flowchart of a host read operation. The host sends a read request with a logical sector address LSA that refers to a sector on the hard disk. The host can first check for a card-present bit by reading a register on the flash-memory cache card (not shown). If the flash-memory cache card is not present, the card-present bit indicates to the host that there is no flash cache present, and can access the hard disk directly.

The LSA from the host request is hashed using modulo the number of entries in the RAM lookup table (LUT) to locate the RAM index of the selected entry, step 202. The physical block address (PBA) that is mapped to this LSA is read from the selected entry in the RAM lookup table. The first page in the PBA pointed to by the selected entry in the RAM LUT is accessed. The LSA and valid bits for the first page of the PBA are read, step 204. When the stored LSA matches and the valid bits are set to the valid state 0,1, step 206, then a hit flag is set in the flash-memory cache card, step 212. The sector data is read from the page in the PBA, step 208, and returned to the host as the read data in lieu of reading sector data from the hard disk.

When the current page in the PBA does not match the LSA, or is not valid, step 206, and there are more pages in the PBA, step 214, then the next page is accessed, steps 210, 204. The LSA and valid bits for the next page are checked for a hit, step 206. Other pages are checked in a similar fashion through steps 214, 210, 204, 206 until a hit is found and data returned, steps 212, 208, or until all pages are checked, step 214. The miss flag is set when there are no valid LSA matches in any of the pages in the PBA, step 216. The host then reads the sector data directly from the hard disk, step 218. Read-allocation then occurs, where the data read from the hard disk is allocated to a new PBA and written into the flash-memory array, starting with step 222 in FIG. 7A.

FIGS. 7A-B is a flowchart of a host write or read-allocation for a read miss. The host sends a write request with the LSA, and may first check for the card-present bit on the flash-memory cache card (not shown).

The LSA from the host request is hashed using modulo the number of entries in the RAM lookup table to locate the RAM index of the selected entry, step 220. The PBA mapped to this LSA is read from the selected entry in the RAM lookup table.

For either host writes or read-allocates from read misses (continued from FIG. 6), the first page in the PBA pointed to by the selected entry in the RAM LUT is accessed. The LSA and valid bits for the first page of the PBA are read, step 222. When the stored LSA matches and the valid bits are set to the valid state 0,1, step 224, then the valid bits for the matching LSA are cleared to 0,0 to invalidate the stale data in this page, step 230.

When the current page has its valid bits set to 1,1, the page is empty, step 226. The write data from the host or the read-miss data from the hard disk is written into the data field of this empty page, step 232. The valid bits are set to 0,1 for this page to indicate that it has valid data, step 234. The access operation can then end.

When the current page in the PBA is not empty, step 226, and there are more pages in the PBA, step 236, then the next page is accessed, steps 238, 222. The LSA and valid bits for the next page are checked for a hit, step 224, and for being empty, step 226.

Other pages are checked in a similar fashion through steps 236, 238, 222, 224, 226 until an empty page is found and written to, steps 226, 232, 234, or until all pages are checked, step 236. When all pages have been checked and no pages are empty, the PBA is full. The write or read-miss data cannot fit in this PBA. A new empty PBA must be located to receive the new data.

FIG. 7B continues operation for host writes or read-miss-allocates when the PBA is full. All valid pages of sector data from the old PBA are written back to the hard disk, step 240. After the data has been successfully written back to the hard disk, and perhaps verified, the old PBA is erased, step 242. Write-back and erase may require much time to complete, but can be performed in the background while foreground areas are accessed. Steps 246 and beyond can be performed while steps 240, 242 are waiting to be performed. Once the old PBA has been erased, its wear-level counter is incremented, step 244.

The old PBA is toggled to the background, and the other data area becomes the foreground area, step 246. A new PBA that is empty and has the lowest wear-leveling count is selected from among the PBA's in the new foreground area, step 248. The new sector data from the host (for a host read) or from the hard disk (for a read-miss-allocate) is written into the first page of the new PBA, step 250.

The valid bits for the first page are set to 0,1 to indicate that the data is valid, step 252. The history counter from the old PBA is read, incremented, and written to the new PBA, step 254. The write or read-miss operation is then completed.

FIG. 8 is a flowchart of wear-leveling management. A wear-leveling counter for a physical block is incremented each time the physical block is erased. Since the electrically-erasable programmable read-only memory (EEPROM) cells in flash-memory chips wear out over use, such as from electrons being embedded or trapped inside oxide or other insulator layers as a result of erase operations, flash memory eventually wears out and is no longer usable or reliable. Wear-leveling is performed to spread out flash usage over the flash-memory array so that a few blocks are not over-used and rendered unusable too soon. Ideally, as many blocks as possible remain usable for as long as possible, and then the blocks begin wearing out at about the same lifetime. Worn-out blocks may be identified and removed from the pool of usable blocks.

When a physical block in either of the data areas or in the wear-leveling-counter pool is erased, its wear-leveling counter is incremented using the routine of FIG. 8. A pool of physical blocks is dedicated to storing wear-leveling counters, wear-leveling-counter pool 56 of FIG. 3. Rather than storing sector data cached from the hard disk, blocks in wear-leveling-counter pool 56 store only wear-leveling counters.

All of the system's wear-leveling counters can fit inside one page in one block. For example, a 512-byte page can contain 128 wear-leveling counters that are 4 bytes per wear-leveling counter. Only one of the blocks in wear-leveling-counter pool 56 contains the current wear-leveling counters; other blocks may contain older, stale wear-leveling counters, or may be erased and ready for use.

Even within the current wear-leveling block, only one page contains the current wear-leveling counters. Other pages within the current wear-leveling block contain slate wear-leveling counters, or are empty (erased). For example, page 2 contains the current wear-leveling counters, while pages 1 and 1 contain older wear-leveling counters that are no longer valid. Page 3 has not yet been used and is erased. When the wear-leveling counters are updated, the new wear-leveling counters are written into empty page 3, and the old counters in pages 0, 1, 2 all become stale.

Each wear-leveling block has a history counter that indicates the age of the wear-leveling counters in that block. The block in wear-leveling-counter pool 56 with the youngest history counter has been updated most recently and contains the freshest wear-leveling counters. This current block with the most recent wear-leveling counters is found in step 302. The history counters for all blocks in wear-leveling-counter pool 56 may be read and compared, or the PBA of the most-recently-updated block may be kept in a RAM or system register that software may read.

Since flash memory can be written from 1 to 0, but cannot be written from 0 to 1, a wear-leveling counter may be incremented (by writing flash without an erase) if the only change in its bits is from a 1 to a 0. For example, when the wear-leveling counter is all ones after an erase, it can be incremented from 11111111 to 11111110 without requiring another erase. However, it cannot be incremented from 11111110 to 11111101 without erasing, or being copied to a pre-erased page. Note that this "incrementing" is using reverse polarity or order, and it could be considered decrementing rather than true incrementing. The larger binary values of the wear-leveling counters indicate a younger count value rather than an older count value.

There may be other increments that can be accomplished without changing bits from 0 to 1, such as an increment from 11110001 to 11110000. Step 306 can check for increments that can be accomplished without changing any bits from 0 to 1, rather than just look for the all 1's case. However, if the flash memory cells can only be written once between erases, then step 306 only looks for the all 1's case.

When step 306 determines that the wear-leveling counter that needs to be updated requires only writes from 1 to 0, such as the all 1's case, then the current page can simply be over-written with the new value of the wear-leveling counter. The current page is the most-recently-written page in the current block, usually the last non-empty page in the block. The current values of all wear-leveling counters are read from the current page in the current wear-leveling block, the wear-leveling counter for the just-erased block is incremented, and the new values are written back into the same current block, step 312. The history counter for the current block can be updated, step 314.

When an update to a wear-leveling counter requires that a bit change from 0 to 1, step 306 fails. A simple write cannot be performed. The next new page to accommodate the new incremented WL value needs to be found if this block is not fully occupied. Instead, all of the wear-leveling counters are copied to a pre-erased block, and a new page is allocated for this purpose When there is an empty page in the same current block, step 308, then the current values of all wear-leveling counters are read from the current page in the current wear-leveling block, the wear-leveling counter for the just-erased block is incremented, and the new values are written back into the next page after the current page in the same current block, step 316. The history counter for the current block can be updated, step 318.

When there are no more empty pages in the current block, step 308, the current block is full. A new block in the wear-leveling-counter pool must be found. Blocks in wear-leveling-counter pool 56 that have been erased and contain no data are found, such as by keeping a list of such blocks, or reading the block ID's of all blocks in wear-leveling-counter pool 56. The wear-leveling counters in the current page are examined to find the lowest wear-leveling count among these erased blocks. The block with the lowest wear-leveling count is chosen as the new wear-leveling counter block, step 310.

The current values of all wear-leveling counters are read from the current (last) page in the current wear-leveling block that is full. The wear-leveling counter for the just-erased block is incremented, and the new values are written to the first page in the new wear-leveling counter block, step 304. The history counter from the old wear-leveling counter is read, incremented, and written into the new wear-leveling counter block, step 305.

FIGS. 9A-D highlight wear-leveling counters being updating and migrated among pages and pre-erased blocks in the wear-leveling-counter pool. Only three of the physical blocks in wear-leveling-counter pool 56 are shown: PBA21, PBA22, and PBA23. Each block has four pages, and each page has 512 bytes of data storage that contain the wear-leveling counters. Up to 128 wear-leveling counters can be stored per page. In the example of FIG. 9, positive incrementing in binary is shown for wear-level counters, rather than negative incrementing as described in FIG. 8.

WLC_PBA0 is the wear-leveling counter for physical block PBA0 in first data area 52, while WLC_PBA10 is the wear-leveling counter for physical block PBA10 in second data area 54. WLC_PBA20 is the wear-leveling counter for physical block PBA20 in wear-leveling-counter pool 56, etc. Some wear-leveling counters may be unused, such as WLC_PBA30 to WLC_PBA127 when the system only has 30 physical blocks as in the simplified example.

In the example shown in FIG. 9A, blocks PBA22 and PBA23 are empty and pre-erased, with block ID's of FFFF and all data set to 1's. Blocks PBA22 and PBA23 are available for future use in wear-leveling-counter pool 56. The history counters for blocks PBA22 and PBA23 are set to 11111111, which indicates an empty block.

Block PBA21 is the current block since it has the youngest history counter value. At first, pages 1, 2, 3 are empty and page 0 is the current page, with the wear-leveling counters for data block PBA0 being 1, and for data block PBA2 also being a 1, indicating that blocks PBA0 and PBA2 have been erased once. All other blocks have counter values of all 1's, indicting that they have never been erased. The history counter for page 0 is 1110, which is younger than 11111111.

PBA2 is erased 4 times in FIG. 9A, while PBA3 is erased twice. The first time PBA2 is erased in FIG. 9A, its wear-leveling counter is incremented from 1 to 2, while the other wear-leveling counters remain the same. The new wear-leveling counter values are written into page 1 of PBA21, and the history counter is updated from 11111110 to 11111100.

Next, PBA2 is erased again, and PBA3 is also erased. The wear-leveling counter for PBA2 is incremented from 2 to 3, while the wear-leveling counter for PBA3 is incremented from all 1's (zero erases) to 1. The other blocks' wear-leveling counters remain the same. The new wear-leveling counter values are written into page 2 of PBA21, and the history counter is updated from 11111100 to 11111000.

Finally in FIG. 9A, PBA2 and PBA3 are both erased again. The wear-leveling counter for PBA2 is incremented from 3 to 4, while the wear-leveling counter for PBA3 is incremented from 1 to 2. The other blocks' wear-leveling counters remain the same. The new wear-leveling counter values are written into page 3 of PBA21, and the history counter is updated from 11111000 to 11110000.

In FIG. 9B, PBA3 is again erased, and its wear-leveling counter must be updated from 2 to 3. However, current wear-leveling counter block PBA21 is full. There are no more empty pages in PBA21. One of the empty blocks in wear-leveling-counter pool 56 is chosen to be the next current wear-leveling counter block. Block PBA23 is chosen since it has the lowest wear-leveling count of the available blocks in wear-leveling-counter pool 56.

The wear-leveling counters in the last page 3 of old current block PBA21 are copied to new current clock PBA23, while the wear-leveling counter for PBA3 is incremented from 2 to 3. The other blocks' wear-leveling counters remain the same. The new wear-leveling counter values are written into first page 0 of PBA23, and the history counter is updated from 11110000 to 1110000. The old wear-leveling counter block PBA21 can begin erase.

Figure 9B:
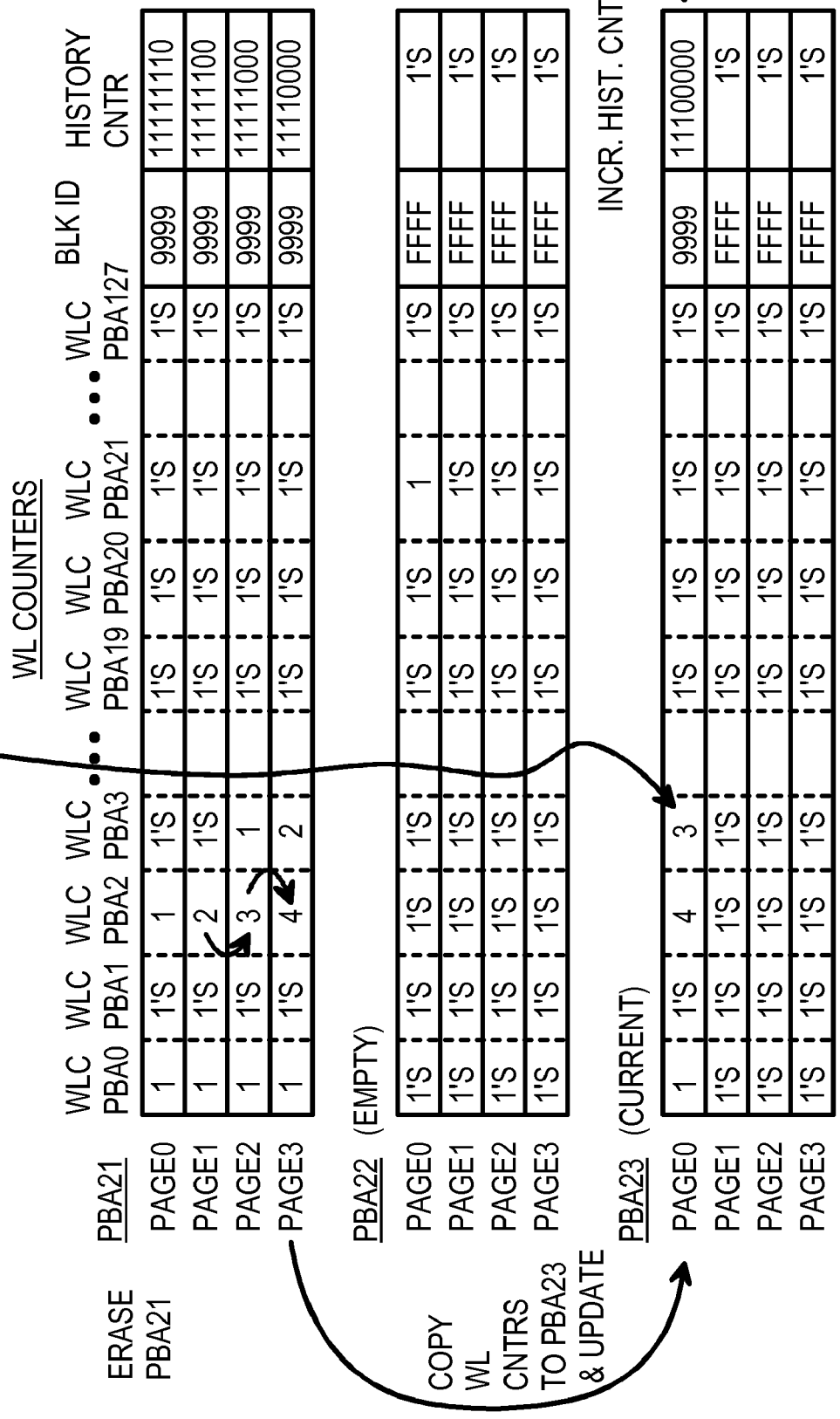
Figure 9C:
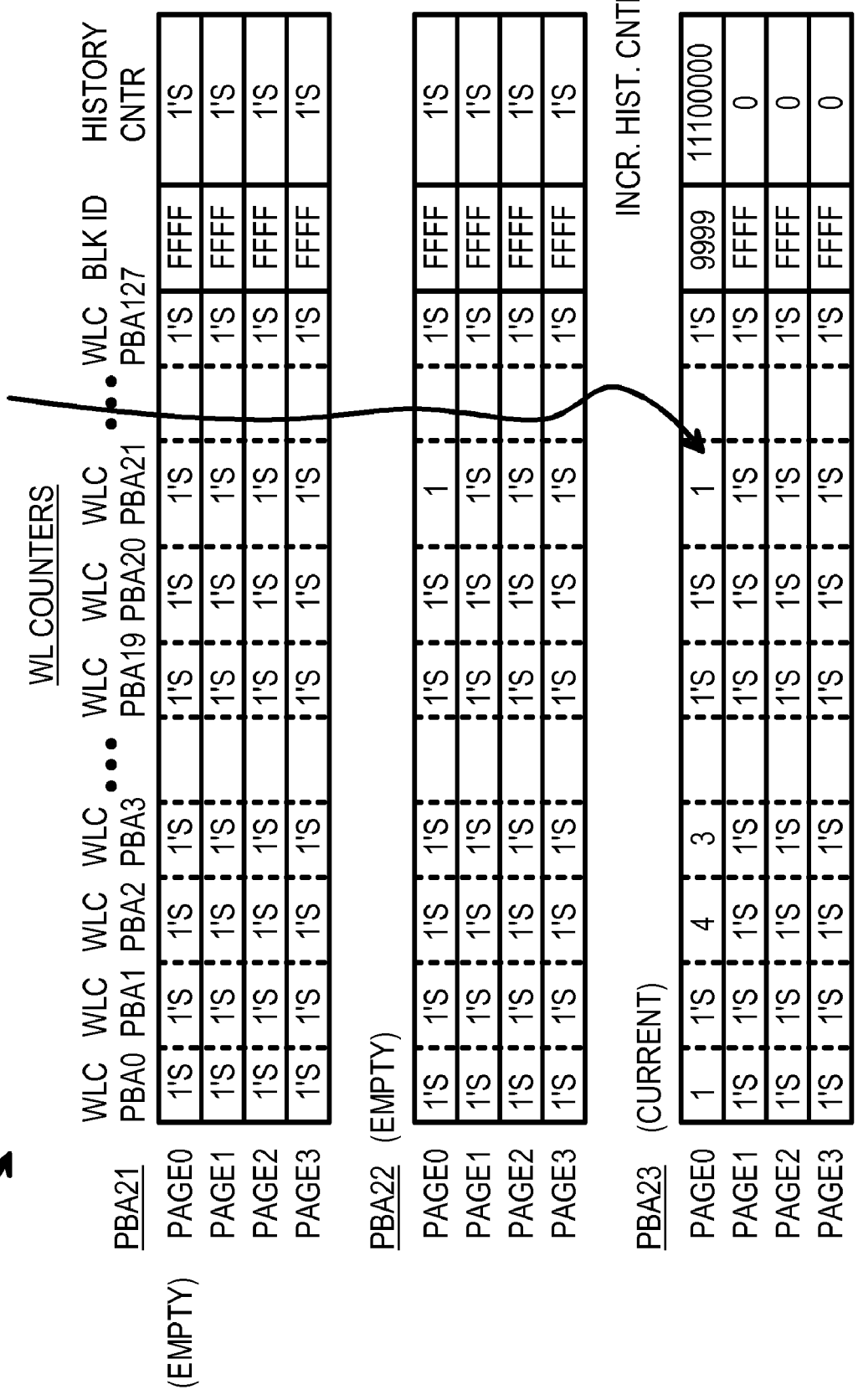

In FIG. 9C, once old block PBA21 is erased, its wear-leveling counter must also be updated. WLC_PBA21 is incremented from all 1's to 1, or binary 00000001. Since this only requires a write from 1 to 0, it can be accomplished without copying all wear-leveling counters to the next page in PBA23. Once PBA21 has been erased, it can be recycled and used again in the future in wear-leveling-counter pool 56.

Figure 9D:
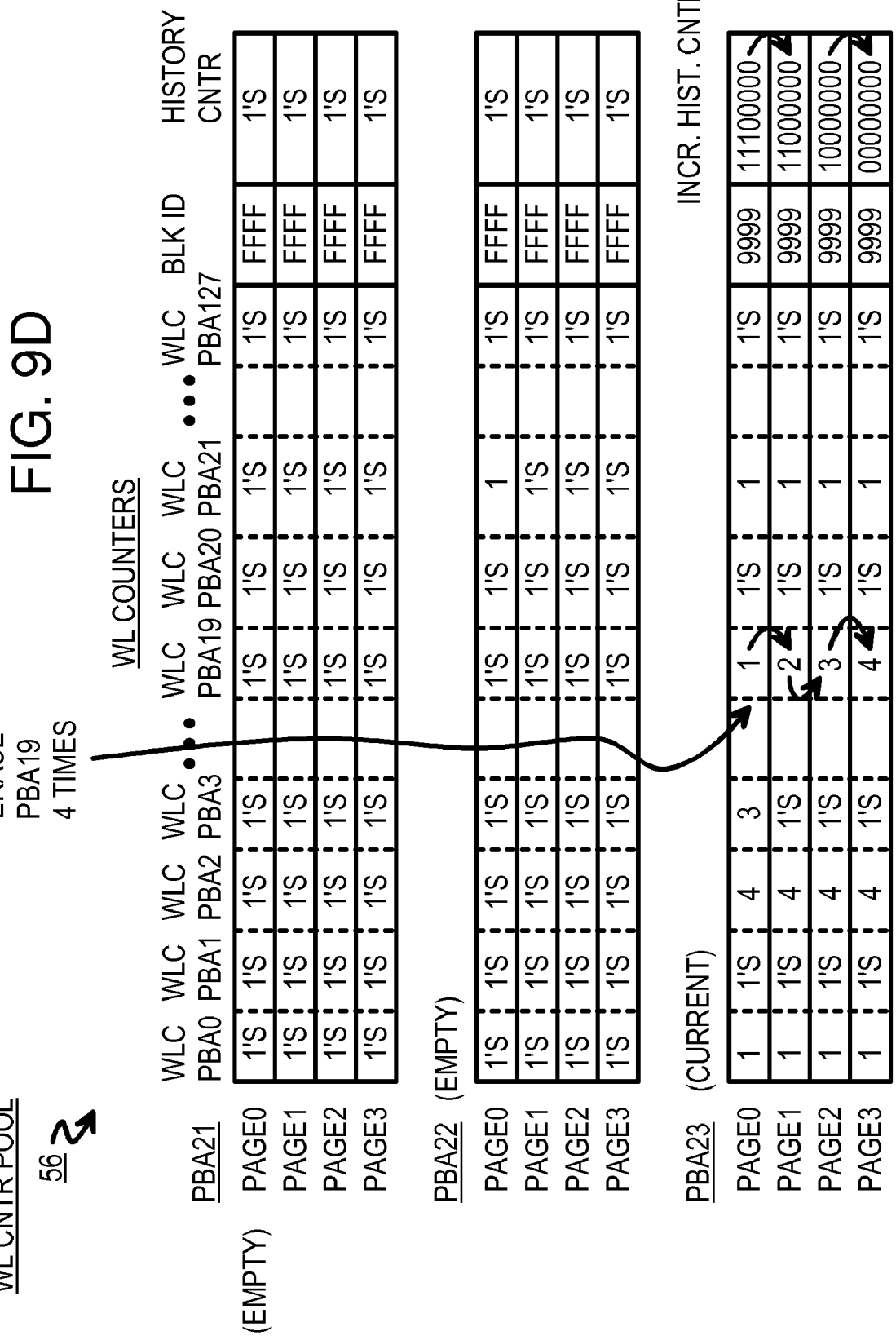

In FIG. 9D, PBA19 is erased four times. For the first erase, the wear-leveling counter for PBA19 changes from all 1's to 1, or from 11111111 to 00000001. Since this only requires a write from 1 to 0, it can be accomplished without copying all wear-leveling counters to the next page in PBA23. WLC_PBA19 is updated within page 0 of current block PBA32.

PBA19 is again erased. This time its wear-leveling counter is updated from 1 to 2, requiring that bits be changed from 0 to 1. The wear-leveling counter for PBA19 is incremented from 1 to 2, while the other blocks' wear-leveling counters remain the same. The new wear-leveling counter values are written into page 1 of PBA23, and the history counter is updated from 1110000 to 1100000.

PBA19 is erased a third time. The wear-leveling counter for PBA19 is incremented from 2 to 3, while the other blocks' wear-leveling counters remain the same. The new wear-leveling counter values are written into page 2 of PBA23, and the history counter is updated from 1100000 to 1000000.

Finally PBA19 is erased a fourth time. The wear-leveling counter for PBA19 is incremented from 3 to 4, while the other blocks' wear-leveling counters remain the same. The new wear-leveling counter values are written into page 3 of PBA23, and the history counter is updated from 1000000 to 0000000.

Figure 10:
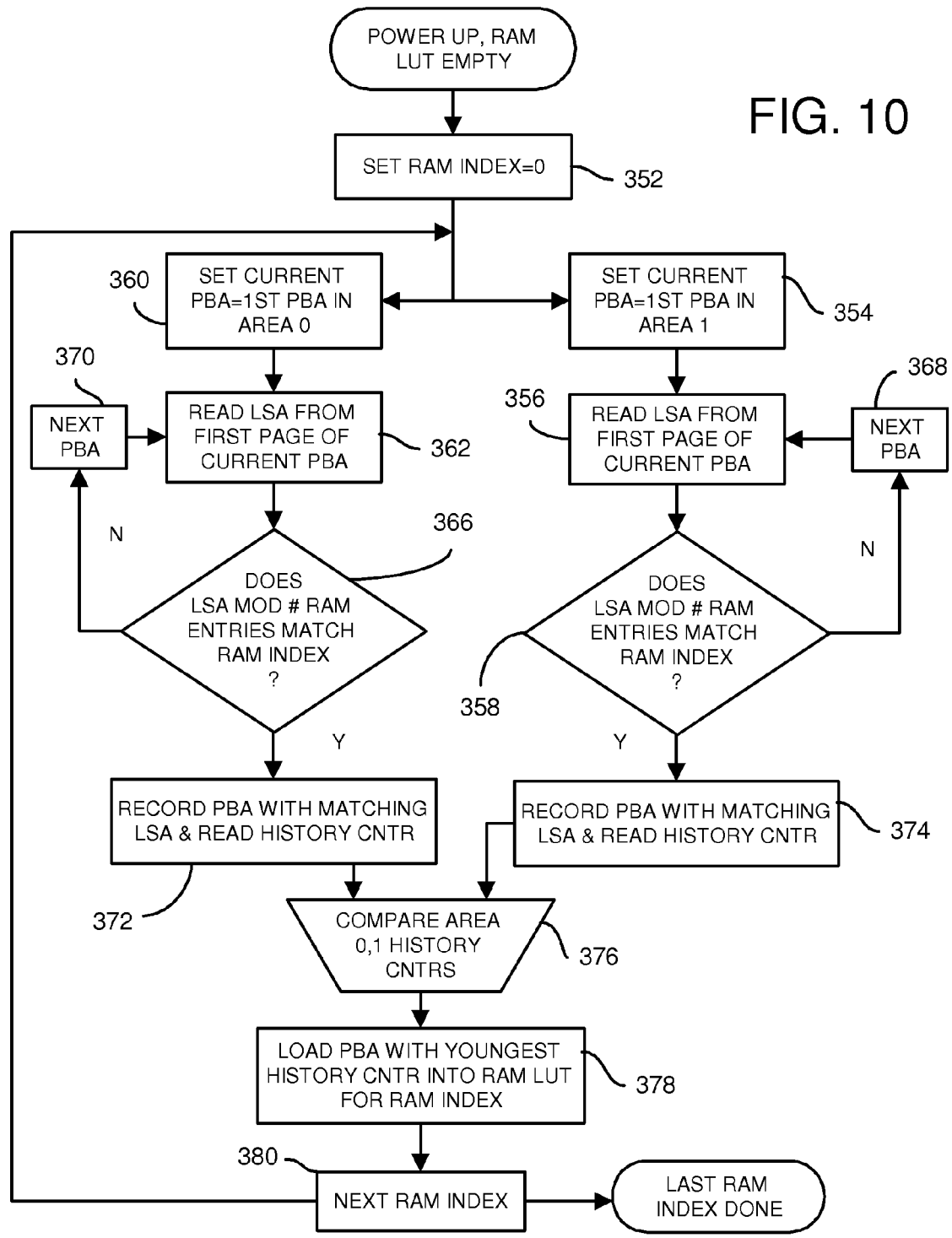
FIG. 10 is a flowchart of a recovery routine from a power failure.

FIG. 10 is a flowchart of a recovery routine from a power failure. When power fails, the mappings in RAM lookup table 40 are lost. The entries in RAM lookup table 40 must be re-constructed from information that is stored in the physical blocks in flash-memory array 50 which are non-volatile.

During power up, the RAM lookup table is initially empty. The index to the RAM lookup table is initially set to 0 to point to the first entry, step 352. The two data areas, first data area 52 and second data area 54, may be processed in parallel as shown or sequentially. For data area 0, first data area 52, the first PBA is accessed as the current PBA, step 360. The LSA stored in the first page is read, step 262. The RAM entry that the stored LSA maps to is generated as the LSA modulo the number of RAM entries, step 366. If the LSA modulo matches the current RAM index, step 366, then the PBA storing that LSA, and its history counter are recorded for later comparison. Otherwise, the next PBA in the area may be accessed, step 370, and its LSA checked to see if it belongs with the current RAM entry, steps 362, 366. Only the first page of each PBA needs to be checked, since all pages in the PBA map to the same RAM index. The valid bits may be checked so that empty pages are skipped over, although first pages with invalidated data may still be checked.

A similar process occurs for the other data area 1, second data area 54, in steps 356, 358, 368, where LSA's are read from the first page of each block in the second area to find PBA's that map to the current RAM index. Once PBA's with LSA's that map to the current RAM index are found for both data areas, steps 372, 374, then the history counters for both areas are compared, step 376. The PBA with the youngest history counter has been loaded most recently and is selected to be loaded into RAM lookup table 40 as the mapping for the current RAM index, step 378.

The next RAM index is selected, step 380, and the process repeated to find PBA's with LSA's that map to this new RAM index, starting with steps 360, 354, and continuing to steps 376, 378. Finally, once all RAM indexes have been processed, all entries in the RAM table have been re-constructed, step 380.

ALTERNATE EMBODIMENTS

Several other embodiments are contemplated by the inventors. For example, the number of pages per block can be more than 4, such as 8, 16, 32, 64, etc. The number of physical blocks in the system can increase, and blocks can be partitioned among the data and wear-leveling counter pools in various ways and also dynamically. The sector size could vary from the 512-byte sector described. The page size can be 512 bytes, 2 K, 4 K bytes or higher, such as for multi-level cell flash memory, but the sector size inherited from hard disk drives may remain 512 bytes for compatibility reasons Other bits may be stored with each page or with each block, such as LRU bits, management or coherency bits, dirty bits, other counters, etc.

While the flash-memory card has been described as being on a Peripheral Component Interconnect Express (PCIE) bus with a PCIE interface, it also could have a USB interface to a USB bus.

Different kinds of flash memory may erase to 0, and only allow writing to 1, not writing from 1 to 0. Some flash memory may allow page erase, rather than whole block erase. Rather than select the PBA with the lowest wear-leveling count, a PBA with a low but not necessarily lowest wear-leveling count could be chosen. Events may occur exactly when described, such as incrementing wear-leveling counters at the start or at the end of erase, or could occur near that time, such as before or after the actual erase operation, toggling, etc. Pipelining, buffering, and other time-shifting operations may be used. Wait states that delay foreground operations may be added, such as when erasing is very slow.

Other incrementing procedures or algorithms could be used, such as counting backwards in binary code, gray code, or using 2's complement, rather than right-shifting zeros. Incrementing can refer to decrementing, and bits could be set to 0 rather than just set to 1, or cleared to 1,1, since inverted bit states or polarities may be used.

Other kinds of hashing besides modulo remainders could be used to map LSA's to Ram entries in RAM lookup table 40. The Ram entries could store other information, and additional memory or registers could be used to store status or program variables that are useful for the flash-memory cache card or its software drivers.

The history counter or other counters may use a counting order other than binary or gray code. For example, the history counter may shift in zeros from the right, then shift in ones from the right, such as in the sequence 11111110, 11111100, 11111000, 11110000, . . . etc. Some values in the sequence may be skipped, such as incrementing from 01111111 to 11111110 by skipping 11111111, which is the erased value. Many sequences and variations are possible.

The history counter could contain many more bits, such as 32 bits rather than 8 bits, allowing for counting up to 32 without erasing from 0 to 1. Counting sequences that minimize bit changes from 0 to 1 could be used, with bit changes from 0 to 1 occurring when a new current block is started, perhaps by skipping other values in the sequence. Since old wear-leveling counter blocks are erased, a large count value may not be needed, as the count could be reset periodically when all block have been erased.

Page order may vary, such as by checking pages 1, 3 first, then checking pages 0,2. Many other sequences may be substituted. Various other steps such as validating data may be added. While a cache for a hard disk drive has been described, other mass storage devices could be cached, using a variety of buses and protocols. The flash-memory cache card may have its own flash-memory array or may use flash memory on another bus, such as on a USB flash card. Some of the caching operations or workload could be processed by the host or by another processor such as the I/O processor, and could be partitioned among software, firmware, and hardware. The flash-memory cache card could be a printed-circuit board (PCB), a smaller plug-in card or device, an device with an external chassis, a board or rack in a larger chassis, or may be integrated with other components or with the host. The data stored on the cached hard disk may come from one or more hosts, peripheral devices, bus masters, or various other sources.

Various other criteria may be considered when choosing blocks for use, such as location when blocks are partitioned among buses or physical devices or cards. Additional restriction on choice of the next block can be added, such as limiting the number or location of physical blocks that can map to a particular RAM index. For example, each LSA could be restricted to mapping to only 1 PBA per area. The RAM table may not be needed in some embodiments with restrictions on mapping. Powers of 2 rather than the simplified powers of 10 may be used for the number of RAM entries.

When the system has more than 128 physical blocks, two or more wear-leveling counter blocks may be current blocks. For example, one current block could contains wear-leveling counters for physical blocks 0 to 127, while a second current block could contain wear-leveling counters for physical blocks 128 to 255. The block ID could indicate which wear-leveling counters are contained in the block, such as by having the block ID 9999 for wear-leveling counters 0-127, and block ID 7777 for wear-leveling counters 128-256.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A flash-memory cache sub-system comprising:

a flash-memory array of physical blocks of flash memory identified by a physical-block address (PBA), a physical block having a plurality of pages, a page having a data sector that can be written with arbitrary data only once before requiring an erase of the physical block;

wherein the data sector is block-addressable and not randomly-addressable, wherein all bytes of the data sector are accessible together as a block an not accessible as individual bytes;

a first data area formed from first physical blocks of flash memory in the flash-memory array;

a second data area formed from second physical blocks of flash memory in the flash-memory array;

wherein each page in the first physical blocks and each page in the second physical blocks stores host data from a host in the data sector for the page, and stores a logical-sector address (LSA) from the host, the LSA from the host being a host address for the host data from the host; and toggle means, activated when host data needs to be stored into a full physical block that has no empty pages, for toggling a full first physical block to a background area by writing data sectors from the full first physical block to an external mass storage device and erasing the full first physical block, and for selecting an empty second physical block to receive the host data; the toggle means also for toggling a full second physical block to the background area by writing data sectors from the full second physical block to the external mass storage device and erasing the full second physical block, and for selecting an empty first physical block to receive the host data.

2. The flash-memory cache sub-system of claim 1 further comprising:

a volatile lookup table having a plurality of M entries, wherein each entry in the plurality of M entries stores a PBA mapping to a first physical block or to a second physical block;

a modulo generator, receiving the LSA from the host, for performing a modulo M operation on the LSA to generate a modulo remainder that identifies a selected entry in the volatile lookup table, the selected entry for storing a PBA mapping indicating a physical block for storing host data identified by the LSA;

the toggle means further for replacing a PBA mapping for the first physical block with a PBA mapping the second physical block in the selected entry in the volatile lookup table;

the toggle means further for replacing a PBA mapping for the second physical block with a PBA mapping the first physical block in the selected entry in the volatile lookup table, whereby host data from host requests are stored in a data sector in a first physical block or in a second physical block that is selected by the PBA mapping in the selected entry in the volatile lookup table that is selected by the modulo remainder from the LSA from the host request.

3. The flash-memory cache sub-system of claim 2 further comprising:

a wear-leveling-counter pool formed from wear-leveling counter physical blocks of flash memory in the flash-memory array;

wherein each page in the wear-leveling counter physical blocks stores a plurality of wear-leveling counters in the data sector for the page, wherein the plurality of wear-leveling counters includes a wear-leveling counter for each first physical block, for each second physical block, and for each wear-leveling counter physical block, whereby wear-leveling counters track wear of physical blocks of flash memory.

4. The flash-memory cache sub-system of claim 3 further comprising:

wear-level selector means for selecting the empty first physical block by examining first wear-leveling counters for the first physical blocks, the wear-level selector means also for selecting the empty second physical block by examining second wear-leveling counters for the second physical blocks, wherein the first wear-leveling counters and the second wear-leveling counters are wear-leveling counters stored in a current wear-leveling counter block in the wear-leveling-counter pool.

5. The flash-memory cache sub-system of claim 4 further comprising:

a history counter stored in each wear-leveling counter block, the history counter indicating a youngest wear-leveling counter block in the wear-leveling-counter pool, wherein the youngest wear-leveling counter block is the current wear-leveling counter block.

6. The flash-memory cache sub-system of claim 5 further comprising:

replacement means for replacing a current wear-leveling counter block with a new current wear-leveling counter block in the wear-leveling-counter pool when all pages in the current wear-leveling counter block are written with wear-leveling count values and a physical block is erased and its wear-leveling counter needs to be updated, whereby the current wear-leveling counter block is replaced.

7. The flash-memory cache sub-system of claim 6 further comprising:

read-miss means for activating the toggle means on a read miss when external data from the external mass storage device is read to the host and the external data also needs to be stored into a full physical block that has no empty pages, whereby area toggling is also activated for read misses.

8. The flash-memory cache sub-system of claim 7 wherein the wear-level selector means further comprises:

first select means for selecting the empty first physical block having a lowest wear-leveling count value for empty blocks in the first wear-leveling counters, and second select means for selecting the empty second physical block having a lowest wear-leveling count value for empty blocks in the second wear-leveling counters;

wherein the PBA mappings stored in the volatile lookup table are lost when power is lost, while the physical blocks of flash memory retain data when power is lost, whereby empty blocks in the first and second data areas are selected based on lowest wear-leveling count values of empty blocks.

9. The flash-memory cache sub-system of claim 5 further comprising:

a Peripheral Component Interconnect Express (PCIE) interface to a PCIE bus, wherein host requests with the LSA and the host data are received over the PCIE bus;

wherein the external mass storage device is a rotating disk that is coupled over an integrated device electronics (IDE) bus or a Serial AT-Attachment (SATA) bus to the PCIE bus through an I/O processor;

wherein host requests to the external mass storage device on the IDE bus or on the SATA bus are intercepted by the PCIE interface to the flash-memory cache sub-system, whereby the external mass storage device is on another bus.

10. The flash-memory cache sub-system of claim 5 further comprising:

a Universal-Serial-Bus (USB) interface to a USB bus, wherein host requests with the LSA and the host data are received over the USB bus;

wherein the external mass storage device is a rotating disk that is coupled over an integrated device electronics (IDE) bus or a Serial AT-Attachment (SATA) bus to the USB bus through an I/O processor;

wherein host requests to the external mass storage device on the IDE bus or on the SATA bus are intercepted by the USB interface to the flash-memory cache sub-system.

11. The flash-memory cache sub-system of claim 9 further comprising:

an external address comparator, for comparing addresses on the PCIE bus to a range of addresses for the external mass storage device on the IDE or SATA bus, wherein the flash-memory cache sub-system intercepts host requests to the external mass storage device to caching data for or from the external mass storage device.

12. The flash-memory cache sub-system of claim 6 wherein the first data area formed from first physical blocks of flash memory in the flash-memory array comprises M first physical blocks;

wherein the second data area formed from second physical blocks of flash memory in the flash-memory array comprises M second physical blocks, whereby a number of entries in the volatile lookup table matches a number of the first physical blocks and matches a number of the second physical blocks.

13. A method for caching data from a rotating disk in a non-volatile flash memory using a volatile lookup table comprising:

intercepting a host request with a host logical-sector address (LSA) for host data stored in the rotating disk;

finding a modulo-M remainder of the host LSA, wherein the volatile lookup table has M entries;

selecting a selected entry in the volatile lookup table using the modulo-M remainder;

reading from the selected entry a selected physical-block address (PBA) of a selected physical block in the non-volatile flash memory;

searching for a page-match by reading a stored LSA for each page and comparing the stored LSA to the host LSA and signaling a page-match when valid bits for the page indicate that the stored LSA is valid;

reading a data sector from a page having a stored LSA that generated the page-match in the selected physical block and sending the data sector to the host and disabling access to the rotating disk when the host request is a read;

activating the rotating disk to return disk-read data to the host when no page-match is found and writing the disk-read data from the rotating disk to the non-volatile flash memory; and searching for an empty page in the selected physical block and writing host data to the empty page when the host request is a write, or writing the disk-read data from the rotating disk to the empty page when the host request is a read and no page-match is found;

when the empty page in the selected physical block is not found, activating a toggle routine to copy data sectors stored in pages of the selected physical block to the rotating disk and to erase the selected physical block, and to select a new selected physical block having an empty page to write the host data or the disk-read data from the rotating disk to the empty page, whereby data areas are toggled when the new selected physical block is selected by the toggle routine.

14. The method of claim 13 wherein the toggle routine further comprises:

writing host data to the empty page in the new selected physical block when the host request is a write, or writing the disk-read data from the rotating disk to the empty page in the new selected physical block when the host request is a read and no page-match is found; and dividing the physical blocks in the non-volatile flash memory into a first data area and into a second data area;

wherein the toggle routine selects the new selected physical block from empty physical blocks in the second data area when the selected physical block having no empty pages is in the first data area, and selects the new selected physical block from empty physical blocks in the first data area when the selected physical block having no empty pages is in the second data area, whereby data areas are toggled when the new selected physical block is selected by the toggle routine.

15. The method of claim 14 further comprising:

replacing the selected entry in the volatile lookup table with a new selected entry that stores a new selected physical-block address (PBA) of the new selected physical block in the non-volatile flash memory when the toggle routine is activated, whereby the selected entry in the volatile lookup table is replaced by the toggle routine.

16. The method of claim 15 further comprising:

updating a wear-leveling counter for the selected physical block when the selected physical block is erased;

searching and comparing wear-leveling counters for empty physical blocks in the first or second data areas to find the new selected physical block, whereby wear-leveling counters assist in selecting the new selected physical block.

17. The method of claim 15 further comprising:

updating a history counter for the new selected physical block by reading and incrementing a history counter from the selected physical block, whereby history counters are updated when the toggle routine is activated.

18. The method of claim 15 further comprising:

when the selected physical block is erased, activating a wear-leveling counter update routine which comprises:

reading and comparing history counters for counter physical blocks in a wear-leveling-counter pool of physical blocks in the non-volatile flash memory to find a youngest history counter that has been updated most-recently;

wherein a current counter physical block in the wear-leveling-counter pool has the youngest history counter;

incrementing a selected wear-leveling counter for the selected physical block when the selected wear-leveling counter has never been written;

searching for an empty counter page in the current counter physical block, and copying wear-leveling counters from a prior counter page in the current counter physical block to the empty counter page and incrementing the selected wear-leveling counter and writing the selected wear-leveling counter to the empty counter page;

when no empty counter page is found in the current counter physical block, finding a new current counter physical block in the wear-leveling-counter pool by examining wear-leveling counters in the current counter physical block for physical blocks in the wear-leveling-counter pool to find the new current counter physical block having a lowest wear-leveling counter value in the wear-leveling-counter pool; and copying wear-leveling counters from a prior counter page in the current counter physical block to the new current counter physical block and incrementing the selected wear-leveling counter and writing the selected wear-leveling counter to the current counter physical block, whereby wear-leveling counters are copied among pages in the current counter physical block and to the new current counter physical block when pages are full.

19. The method of claim 18 further comprising:

erasing the current counter physical block when no empty counter page is found in the current counter physical block and the wear-leveling counters are copied to the new current counter physical block.

20. A method for restoring a volatile lookup table for a non-volatile cache of a rotating disk after power is interrupted comprising:

selecting a current entry from among M entries in the volatile lookup table;

(a) reading a first logical-sector address (LSA) from each first physical block in a first data area of a flash-memory array, and finding a first modulo-M remainder of the first LSA, and when the first modulo-M remainder matches an identifier for the current entry in the volatile lookup table, reading a first history counter from the physical block;

reading a second LSA from each second physical block in a second data area of the flash-memory array, and finding a second modulo-M remainder of the second LSA, and when the second modulo-M remainder matches the identifier for the current entry in the volatile lookup table, reading a second history counter from the physical block;

comparing the first history counter to the second history counter;

writing a mapping to the first physical block to the current entry in the volatile lookup table when the first history counter indicates a count value that was more recently updated than the second history counter;

writing a mapping to the second physical block to the current entry in the volatile lookup table when the second history counter indicates a count value that was more recently updated than the first history counter;

selecting another current entry from among the M entries in the volatile lookup table and repeating from (a) until all M entries in the volatile lookup table have been processed, whereby the volatile lookup table is restored from the flash-memory array in the non-volatile cache.

21. The method of claim 20 further comprising:

intercepting a host request with a host logical-sector address (LSA) for host data stored in the rotating disk;

finding a modulo-M remainder of the host LSA, wherein the volatile lookup table has M entries;

selecting a selected entry in the volatile lookup table using the modulo-M remainder; and reading from the selected entry a selected physical-block address (PBA) of a selected physical block in the non-volatile flash memory.

\* \* \* \* \*